US011096220B2

(12) United States Patent
Xiong et al.

(10) Patent No.: US 11,096,220 B2
(45) Date of Patent: Aug. 17, 2021

(54) METHOD AND APPARATUS FOR TRANSMITTING AND RECEIVING UPLINK DATA

(71) Applicant: Samsung Electronics Co., Ltd., Suwon-si (KR)

(72) Inventors: Qi Xiong, Beijing (CN); Bin Yu, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 16/497,424

(22) PCT Filed: Mar. 23, 2018

(86) PCT No.: PCT/KR2018/003469
§ 371 (c)(1),
(2) Date: Sep. 24, 2019

(87) PCT Pub. No.: WO2018/174656
PCT Pub. Date: Sep. 27, 2018

(65) Prior Publication Data
US 2020/0245361 A1 Jul. 30, 2020

(30) Foreign Application Priority Data

Mar. 24, 2017 (CN) .......................... 201710183439.6
Nov. 17, 2017 (CN) .......................... 201711147497.X

(51) Int. Cl.
H04W 74/08 (2009.01)
H04W 74/00 (2009.01)
(Continued)

(52) U.S. Cl.
CPC ....... H04W 74/0833 (2013.01); H04W 72/14 (2013.01); H04W 74/006 (2013.01); H04W 76/11 (2018.02); H04W 80/02 (2013.01)

(58) Field of Classification Search
CPC . H04W 72/14; H04W 74/004; H04W 74/006; H04W 74/0833; H04W 76/11; H04W 80/02
(Continued)

(56) References Cited

U.S. PATENT DOCUMENTS

2012/0320874 A1* 12/2012 Li .......................... H04W 48/12
370/331
2016/0100422 A1 4/2016 Papasakellariou et al.
(Continued)

OTHER PUBLICATIONS

ISA/KR, International Search Report and Written Opinion of the International Searching Authority, International Application No. PCT/KR2018/003469, dated Jul. 13, 2018, 12 pages.
(Continued)

Primary Examiner — Gbemileke J Onamuti

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present application discloses a method for operating a user equipment (UE) in a wireless communication system, the method comprising: receiving, from a base station, a random access response (RAR); extracting a UL delay parameter from an uplink grant in the RAR; determining, and according to a time unit index n and the UL delay parameter, the time to transmit an Msg3 in the random access process of the UE; and transmitting the Msg3 according to the determined transmission time, wherein the n is a time unit index of the RAR or a time unit index indicating a downlink control channel of the RAR. With the present application, it is beneficial to improve the transmission performance of the system.

16 Claims, 13 Drawing Sheets

(51) Int. Cl.
*H04W 72/14* (2009.01)
*H04W 80/02* (2009.01)
*H04W 76/11* (2018.01)

(58) Field of Classification Search
USPC .......................................................... 370/329
See application file for complete search history.

(56) References Cited

U.S. PATENT DOCUMENTS

| 2016/0219624 | A1 | 7/2016 | Lin et al. |
| 2016/0227575 | A1 | 8/2016 | Furuskog et al. |
| 2016/0270038 | A1 | 9/2016 | Papasakellariou |
| 2016/0330768 | A1* | 11/2016 | Hu .................... H04W 74/0833 |

OTHER PUBLICATIONS

ITU-R, Radiocommunication Sector of ITU, Report ITU-R M.2320-0 (Nov. 2014), "Future technology trends of terrestrial IMT systems," Nov. 2014, 32 pages.

ITU-R, Radiocommunication Sector of ITU, Recommendation ITU-R M.2083-0 (Sep. 2015), "IMT Vision—Framework and overall objectives of the future development of IMT for 2020 and beyond," Sep. 2015, 21 pages.

ITU, Radiocommunication Study Groups, Document 5D/TEMP/466-E, SWG Traffic, "IMT Traffic estimates beyond year 2020," Oct. 21, 2014, 35 pages.

NTT DOCOMO, Inc., et al., "Clarification on MSG 3/4 MPDCCH narrowband index," R1-1703488, 3GPP TSG-RAN WG1 Meeting #88, Athens, Greece, Feb. 13-17, 2017, 11 pages.

* cited by examiner

[Fig. 1]
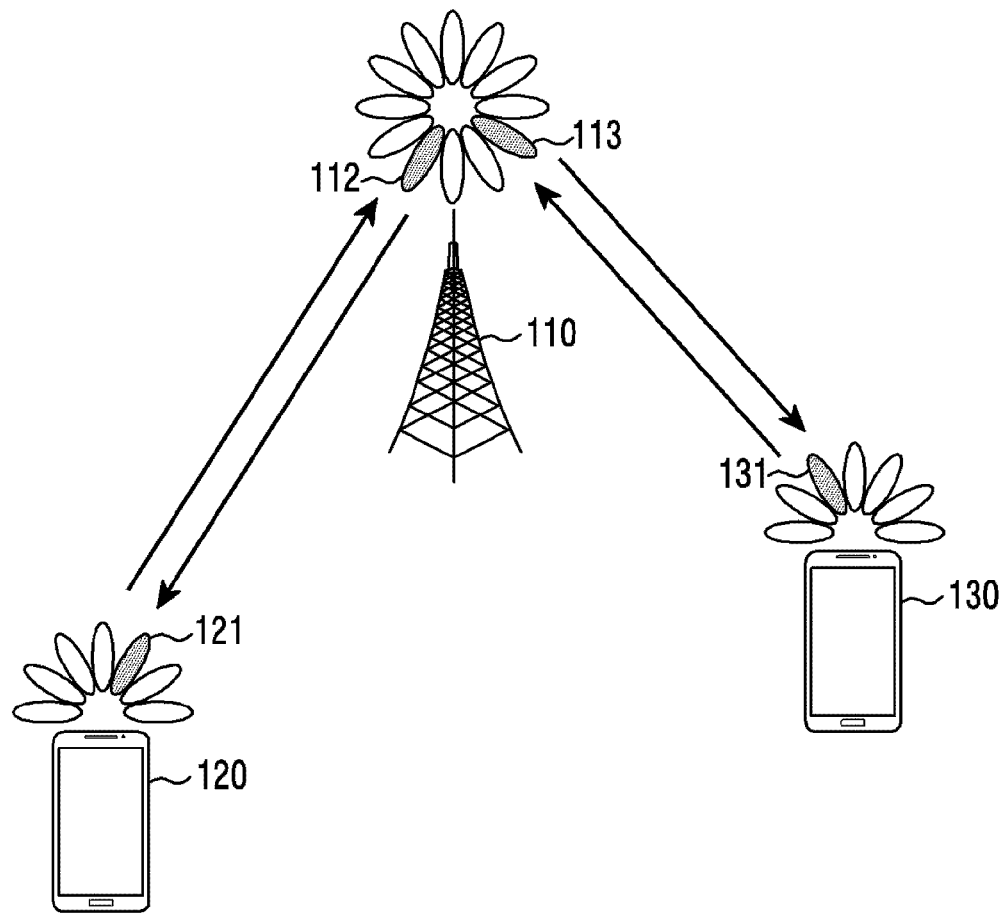
[Fig. 2]
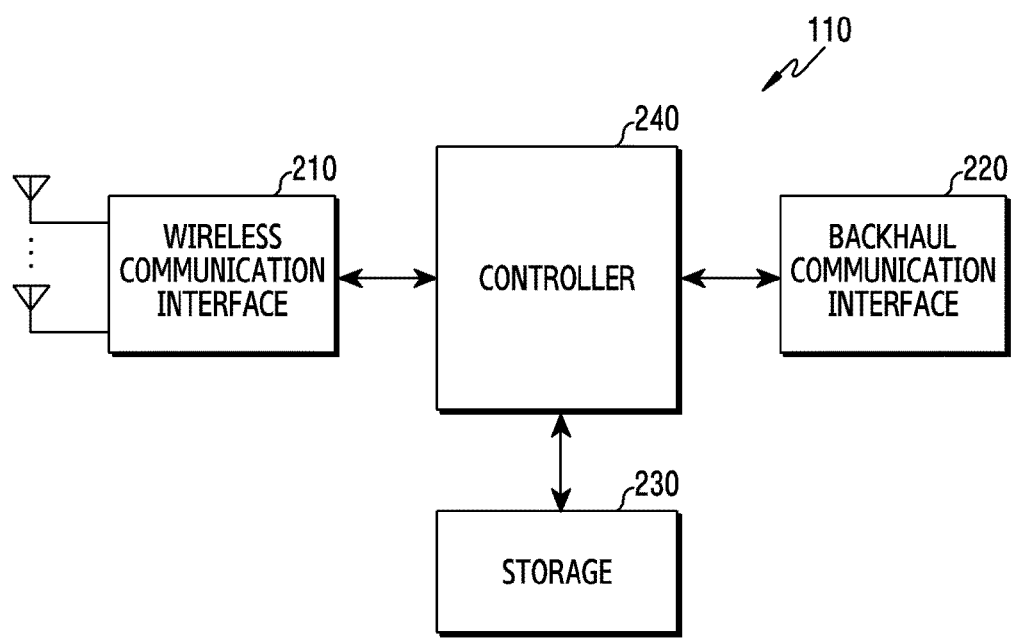

[Fig. 3]
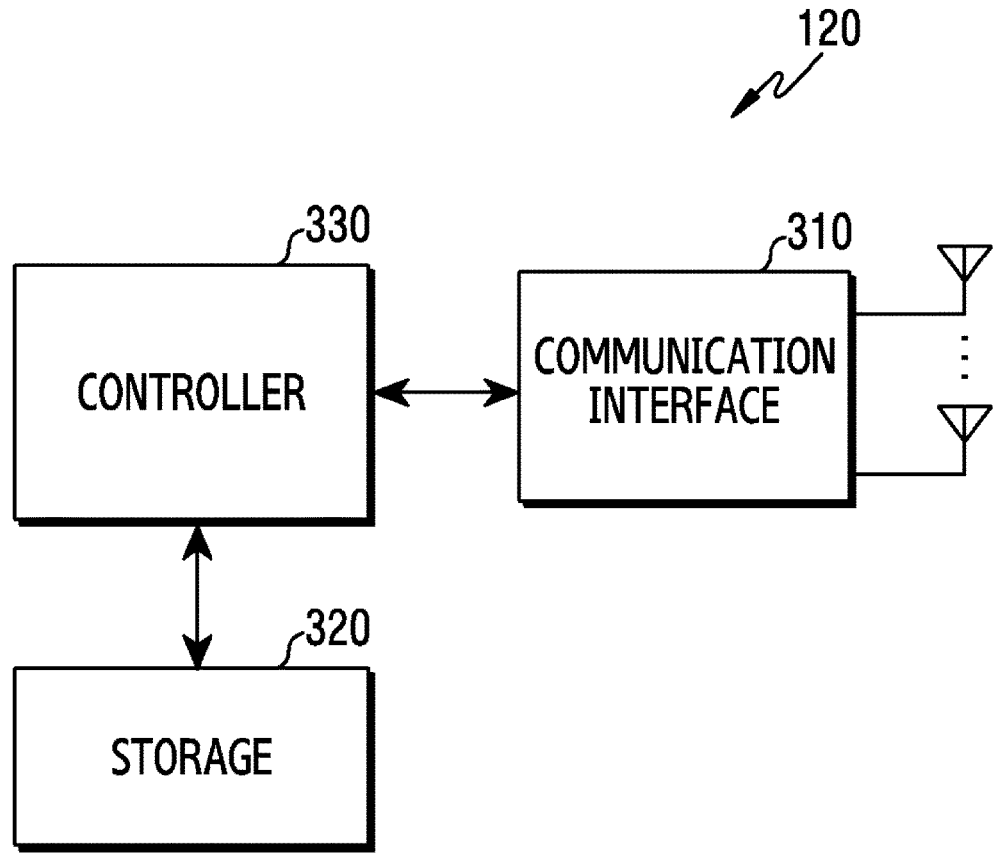
[Fig. 4]
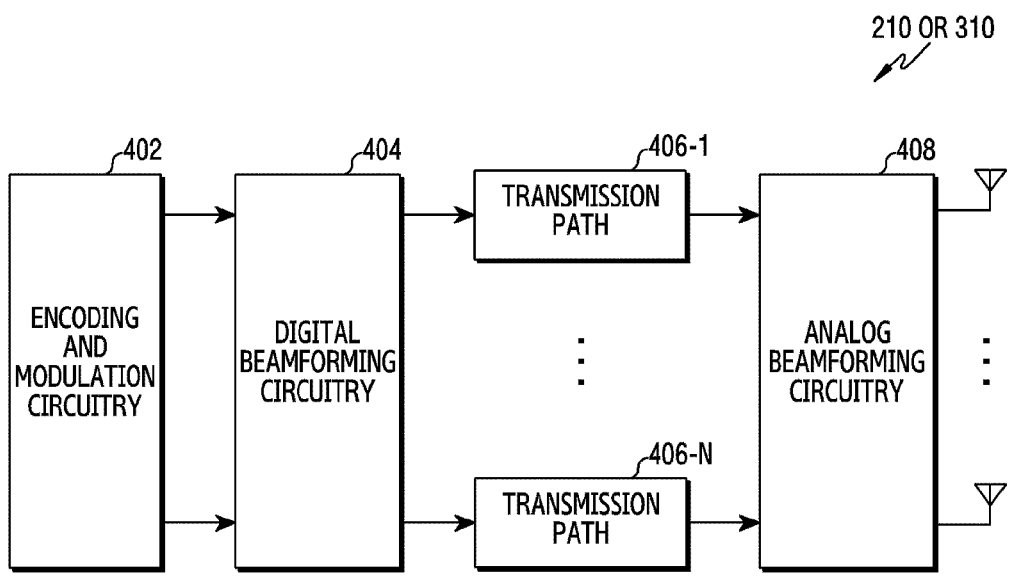

[Fig. 5]
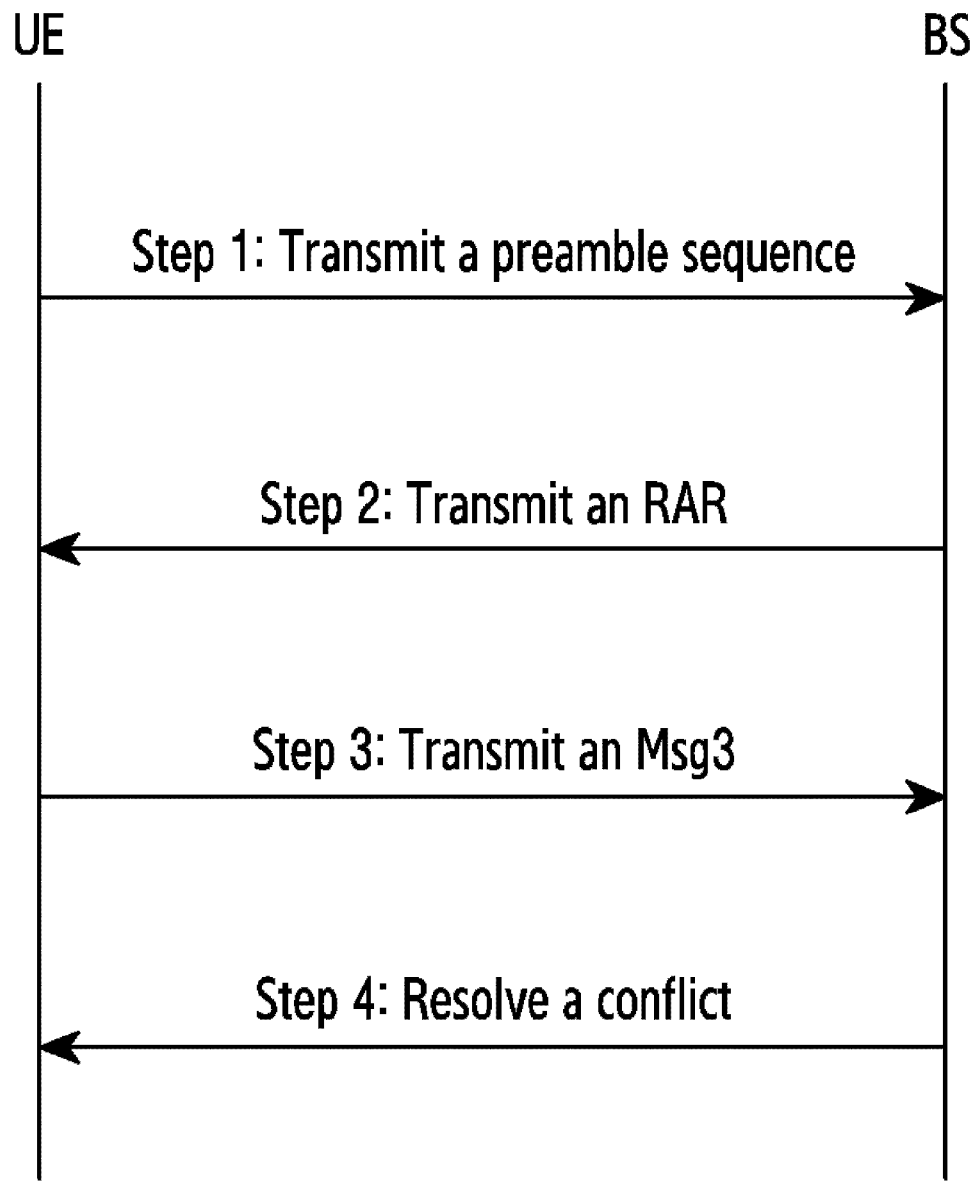

[Fig. 6]
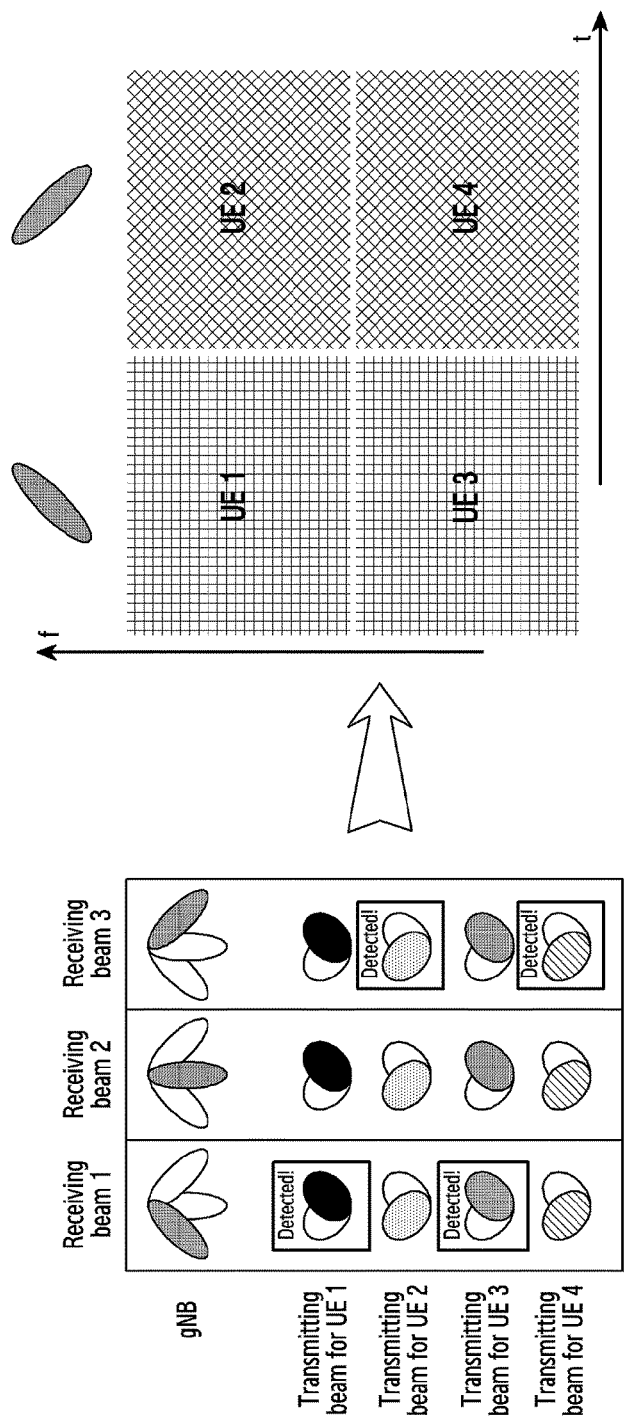

[Fig. 7]
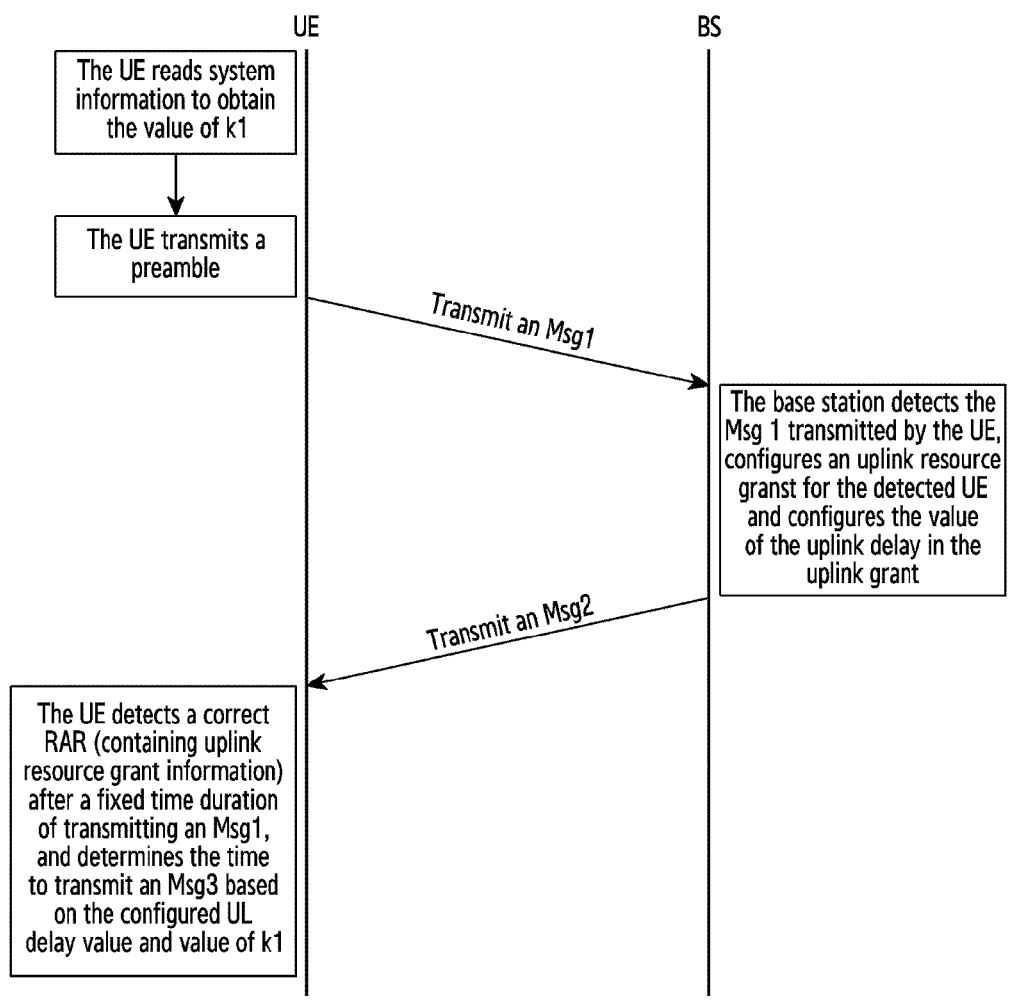

[Fig. 8]
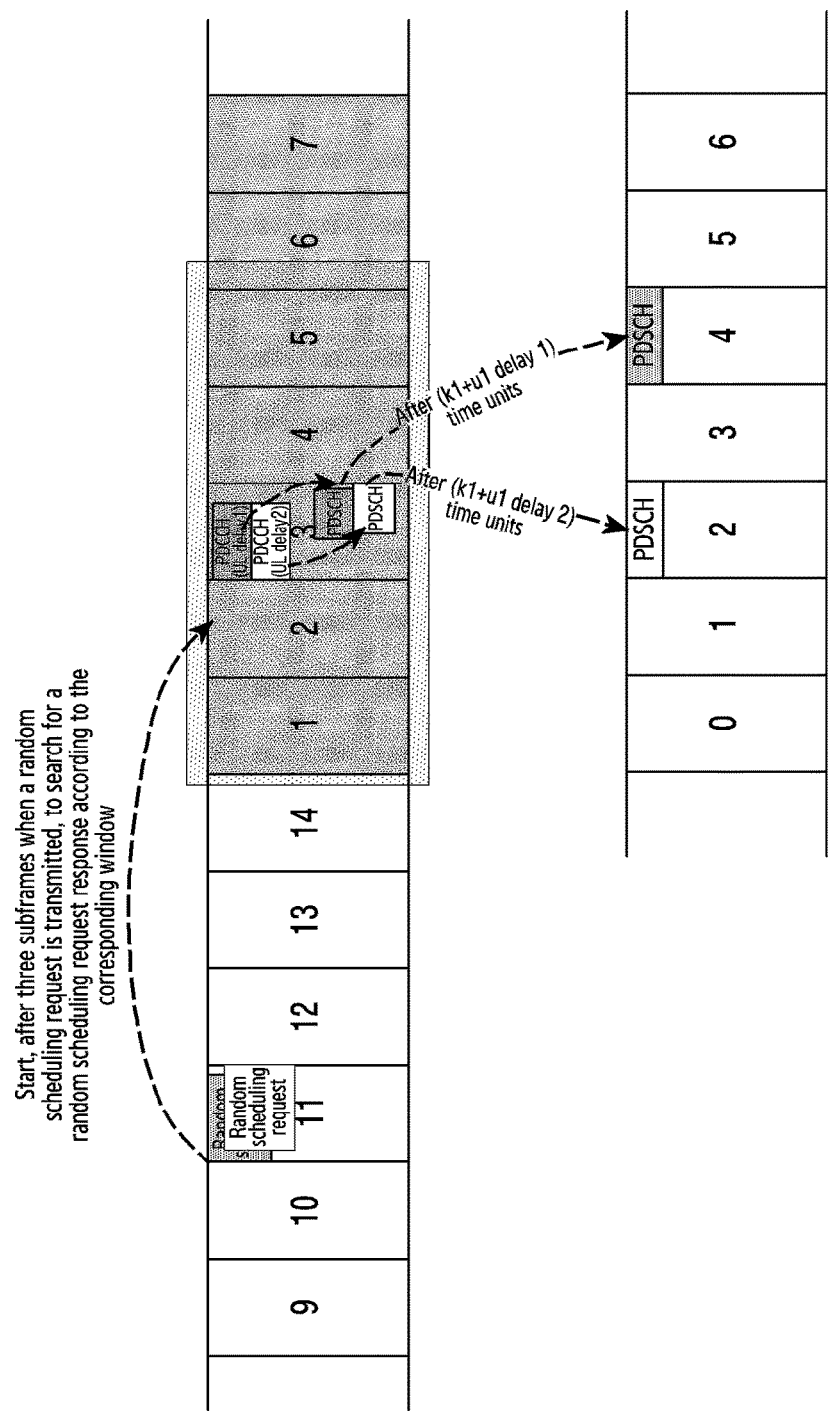

[Fig. 9]
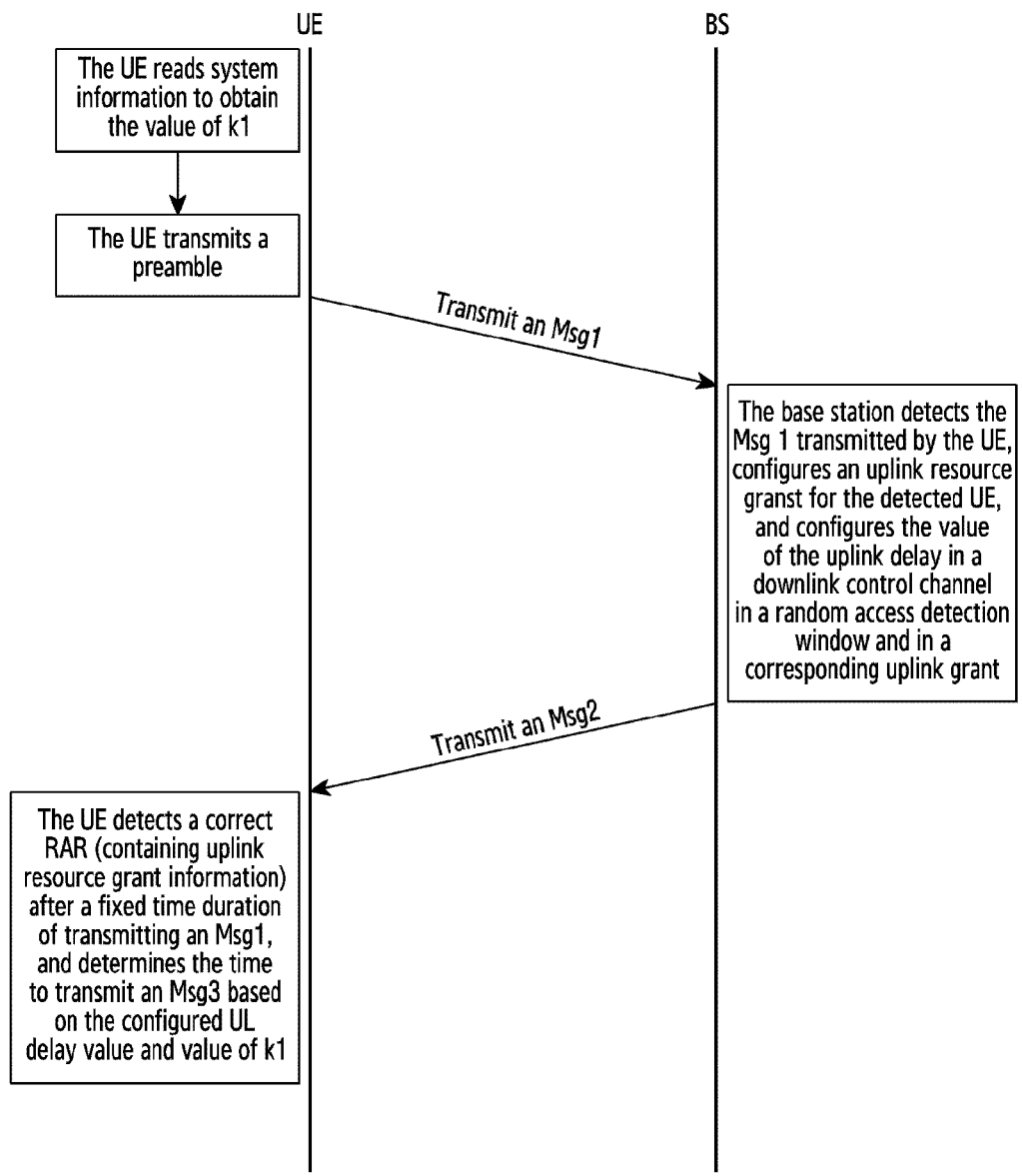

[Fig. 10]
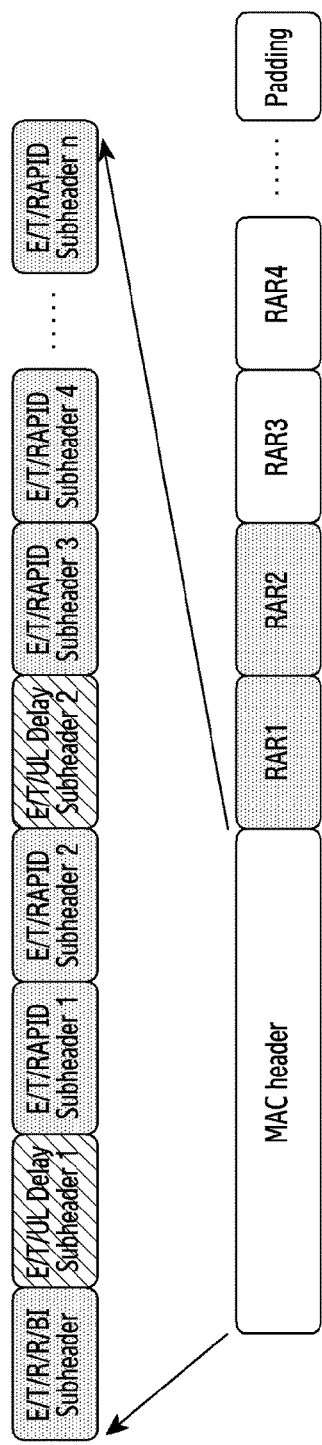

[Fig. 11]
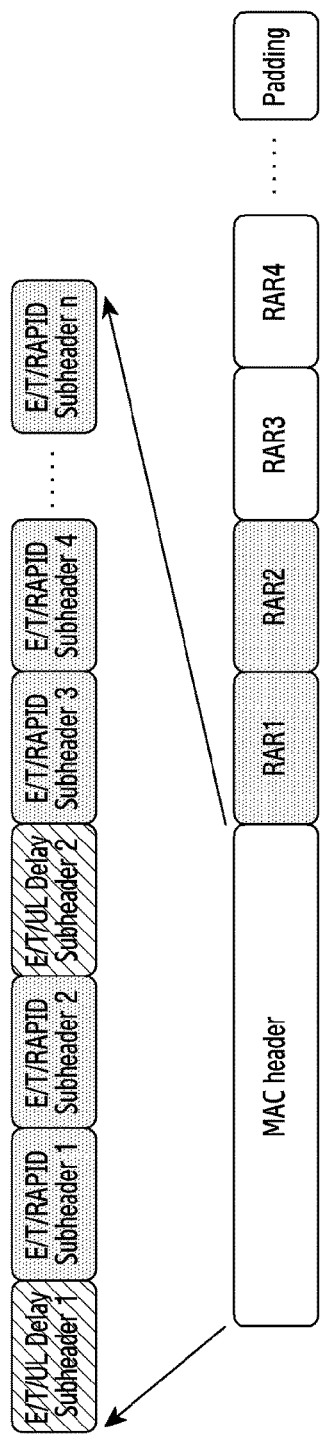

[Fig. 12]
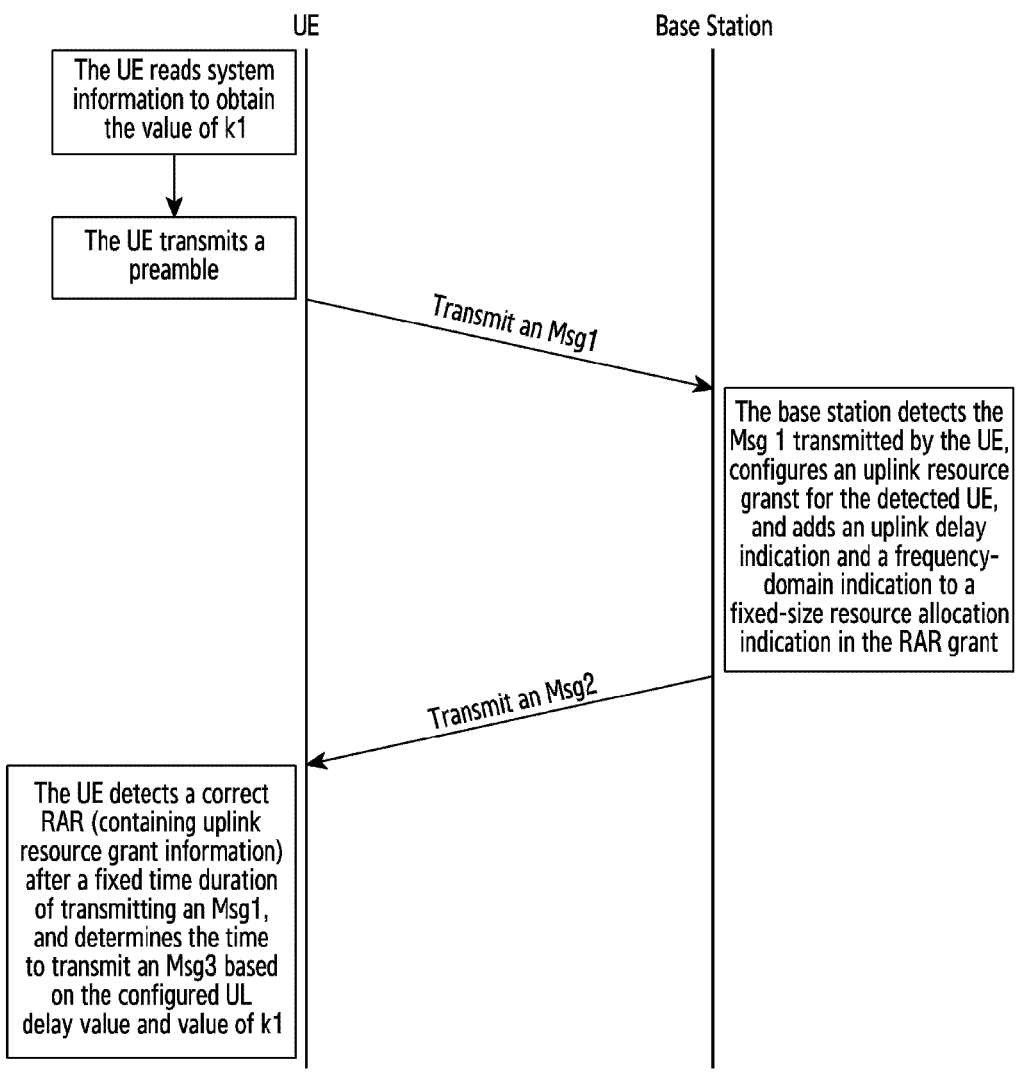

[Fig. 13]
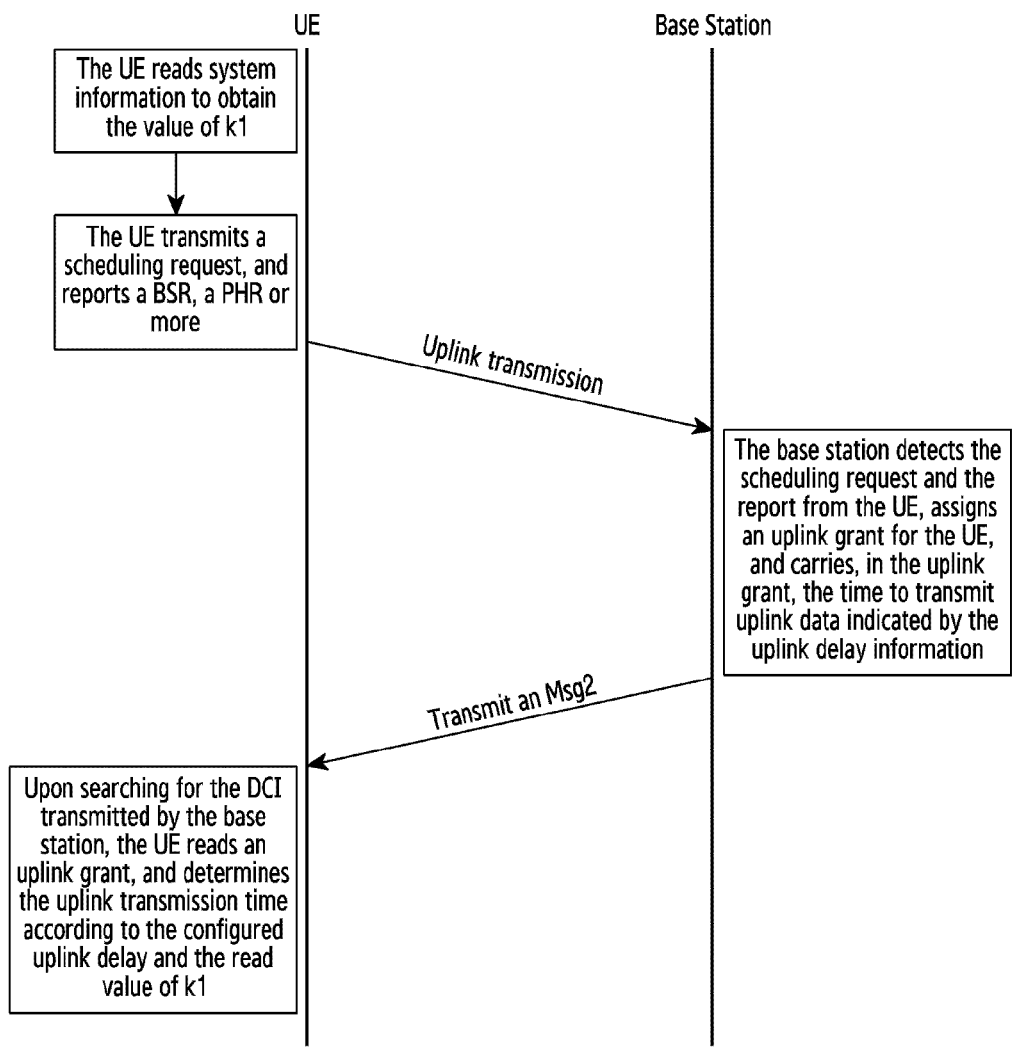

[Fig. 14]
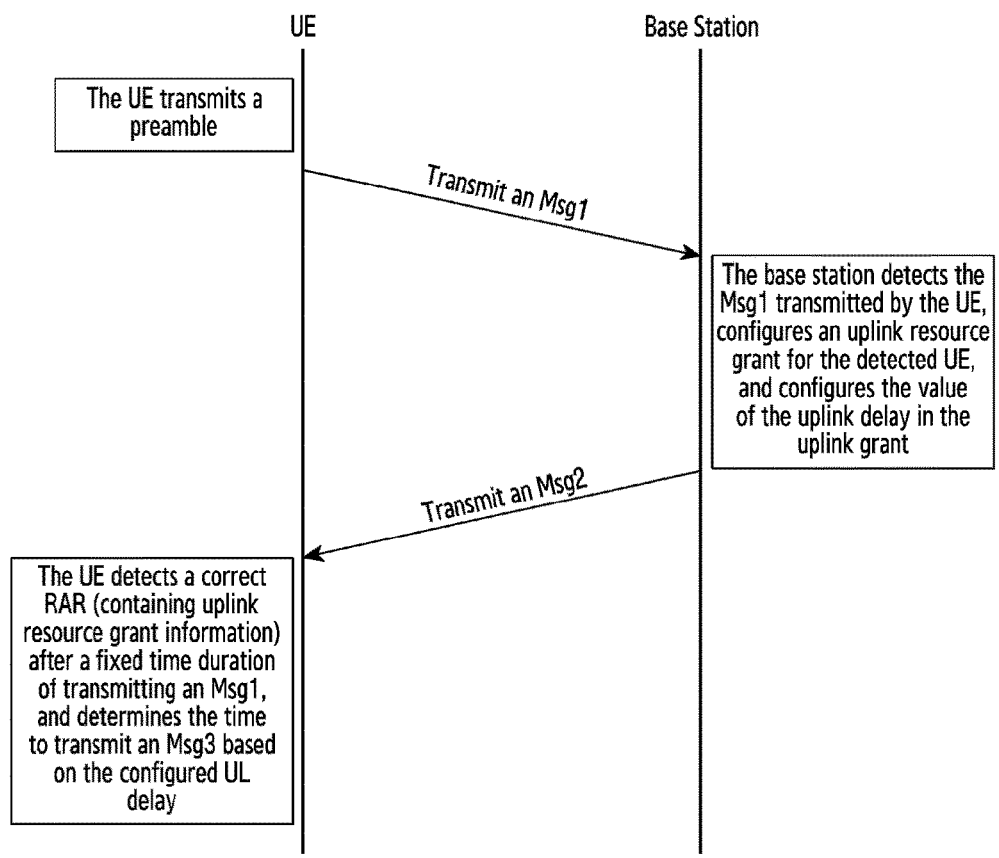

[Fig. 15]
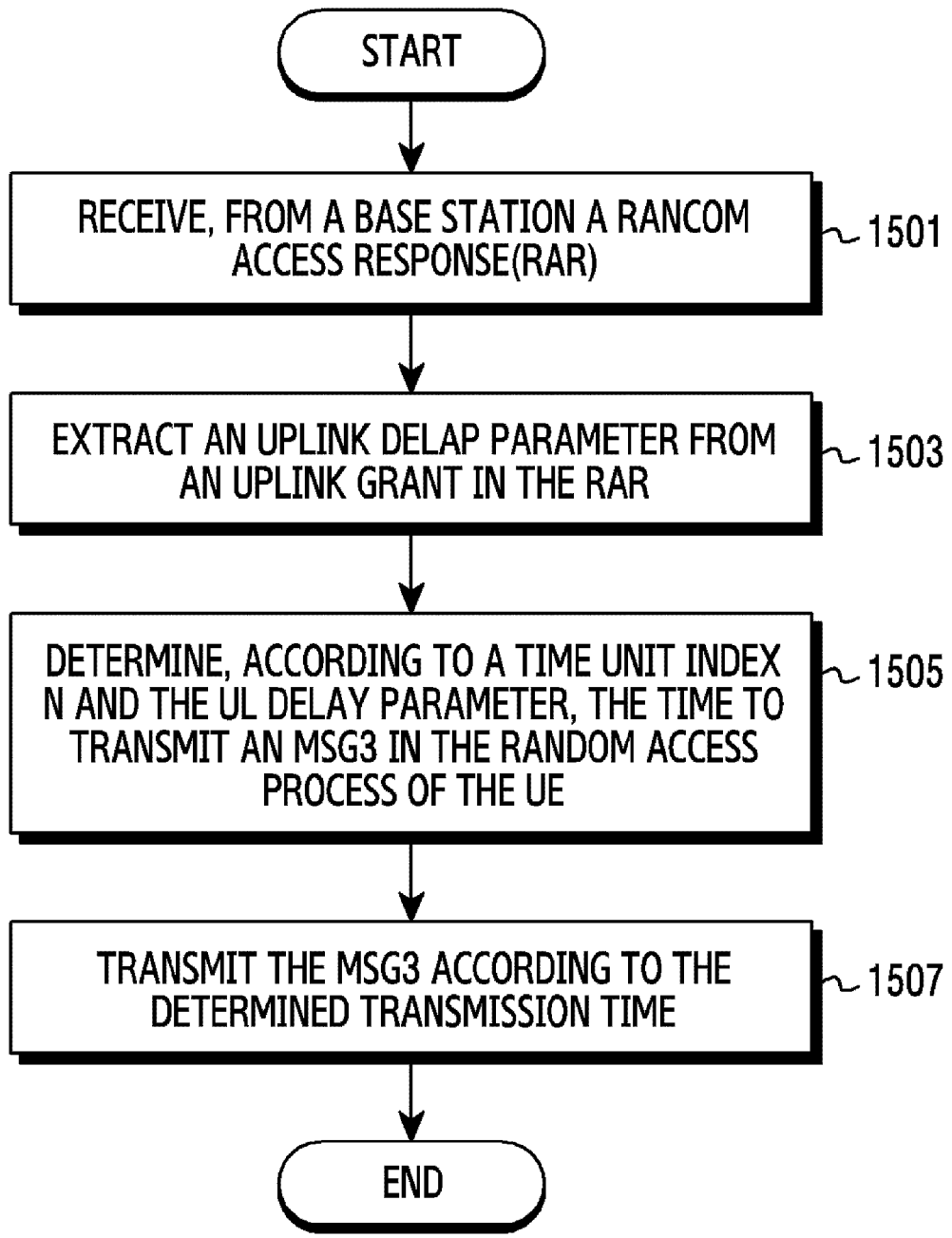

METHOD AND APPARATUS FOR TRANSMITTING AND RECEIVING UPLINK DATA

CROSS-REFERENCE TO RELATED APPLICATIONS

This application is a 371 National Stage of International Application No. PCT/KR2018/003469, filed Mar. 23, 2018, which claims priority to Chinese Patent Application No. 201710183439.6, filed Mar. 24, 2017, and Chinese Patent Application No. 201711147497.X, filed Nov. 17, 2017, the disclosures of which are herein incorporated by reference in their entirety.

BACKGROUND

1. Field

The present application relates to the technical field of radio communication, and in particular to a method and equipment for transmitting and receiving uplink data.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

The present application provides a method and equipment for transmitting and receiving uplink data, which can improve the data transmission and reception performances.

For this purpose, the present application employs the following technical solutions.

According to various embodiments of the present disclosure, a method for operating a user equipment (UE) in a wireless communication system is provided. The method comprises: receiving, from a base station, a random access response (RAR); extracting an uplink delay (UL delay) parameter from an uplink grant in the RAR; determining, according to a time unit index n and the UL delay parameter, the time to transmit an Msg3 in the random access process of the UE; and transmitting the Msg3 according to the determined transmission time, wherein the n is a time unit index of the RAR or a time unit index indicating a downlink control channel of the RAR.

According to various embodiments of the present disclosure, a method for operating a user equipment (UE) in a wireless communication system is provided. The method comprises: receiving, from a base station, downlink control channel information; receiving, according to an indication of the downlink control channel information, an uplink data transmission grant transmitted to the UE; extracting an uplink delay (UL delay) parameter from a Media Access control (MAC) header of the uplink data transmission grant message or from the downlink control channel information, determining, according to a time unit index n and the first UL delay parameter, the time to transmit uplink data by the UE; and transmitting the uplink data according to the determined transmission time, wherein the n is a time unit index of the uplink data transmission grant or a time unit index of the downlink control channel.

According to various embodiments of the present disclosure, a user equipment (UE) in a wireless communication system is provided. The UE comprises: a transceiver; and at least one processor, wherein the at least one processor is configured to receive, from a base station, a random access response (RAR) and extract a UL delay parameter from an uplink grant in the RAR and wherein the transceiver is configured to determine the time to transmit an Msg3 in the random access process of the UE, according to a time unit index n and the UL delay parameter, and transmit the Msg3 according to the determined transmission time, wherein the n is a time unit index of the RAR or a time unit index indicating a downlink control channel of the RAR.

According to various embodiments of the present disclosure, a user equipment (UE) in a wireless communication system is provided. The UE comprises: a transceiver; and at least one processor, wherein the transceiver is configured to receive, from a base station, downlink control channel information and receive an uplink data transmission grant according to an indication of the downlink control channel information; wherein the at least one processor is configured to extract a first UL delay parameter from an MAC header of the uplink data transmission grant message or from the downlink control channel information; and wherein the transceiver is further configured to determine, according to a time unit index n and the first UL delay parameter, the time to transmit uplink data by the UE, and transmit the uplink data according to the determined transmission time, wherein the n is a time unit index of the uplink data transmission grant or a time unit index of the downlink control channel.

It can be seen from the above technical solutions that, in the present application, a UL delay parameter can be carried in downlink control channel information, an MAC header of an RAR or a fixed-size resource allocation indication, so that the setting of the UL delay parameter is more flexible and it is thus beneficial to improve the data transmission and reception performances.

BRIEF DESCRIPTION OF THE DRAWINGS

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is a schematic diagram of a contention-based random access process in LTE-A;

FIG. 6 is a schematic diagram of receiving signals from different UEs by different uplink receiving beams in the random access process;

FIG. 7 is a schematic flowchart of determining, by a UE, the time to transmit an Msg3 according to Embodiment 1;

FIG. 8 is a schematic diagram of searching, by a UE, downlink control channel information within a random access detection window;

FIG. 9 is a schematic flowchart of determining, by a UE, the time to transmit an Msg3 according to Embodiment 2;

FIG. 10 is a schematic diagram of an MAC header having MAC subheaders in a format 1 according to Embodiment 3;

FIG. 11 is a schematic diagram of an MAC header having MAC subheaders in a format 2 according to Embodiment 3;

FIG. 12 is a schematic flowchart of determining, by a UE, the time to transmit uplink transmission (an Msg3) according to Embodiment 4;

FIG. 13 is a schematic flowchart of determining, by a UE, the time to transmit uplink transmission according to Embodiment 5; and FIG. 14 is a schematic flowchart of determining, by a UE, the time to transmit an Msg3 only by the value of a UL delay according to Embodiment 6.

FIG. 15 is a flowchart for operation of a UE according to various embodiments of the present disclosure.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for a grant-free data transmission in a wireless communication system.

The terms referring to grant-free, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

With rapid development of information industry, especially increasing requirements from mobile Internet and Internet of things (IoT), mobile communication techniques are facing unprecedented challenges. According to International Telecommunication Union (ITU) report ITU-R M.[IMT BEYOND 2020.TRAFFIC], it can be predicted that as of 2020, mobile service amount will increase 1000 times compared with that in 2010 (4G era), and the connected user devices will exceed 17 billion. With involvement of IoT devices into the mobile communication networks, the number of connected user devices may be more astonishing. Under the unprecedented challenges, communication industry and the academia have started intensive researches in fifth generation mobile communication techniques (5G) facing 2020. At present, architecture and global objective of future 5G have been discussed in the ITU report ITU-R M.[IMT.VISION], which provides detailed description including requirement prospect, application scenarios and various important performances of 5G. With respect to new requirements of 5G, the ITU report ITU-R M.[IMT.FUTURE TECHNOLOGY TRENDS] provides information related to technology trends of 5G, aims to solve dramatic problems such as system throughput, user experience consistency, extendibility, supporting IoT, tendency, efficient, cost, network flexibility, supporting of new services and flexible spectrum utilization.

The requirement of supporting massive machine-type communication (mMTC) is proposed in 5G, there will be millions of connections per square meter, which is far higher than the current connection density supported by the current standards. The service requirements of the large amount of connections may lead to high cost of original communication procedure of LTE, especially for the schedule-based data transmission such as random access, scheduling request. This may lead to a signaling storm and a large part of bandwidth may be used for transmitting signaling instead of data, which greatly decreases the spectrum efficiency and effectiveness of the system and also increases power consumption of the UE. This goes against to the requirement of power consumption in mMTC services.

In addition, ultra-reliable low-latency communication (URLLC) proposed in 5G has requirements on both latency and reliability. It requires an end-to-end latency less than 1 ms and a block error rate lower than 10-5. It also gives challenges to the conventional LTE communication procedures. For example, although the conventional schedule-based communication procedure is able to decrease block error rate of data transmission by decreasing code rate, increasing bandwidth or time-domain repeating, the complicated scheduling in the conventional LTE communication procedure will increase the data transmission delay, which is unfavorable for meeting the latency requirement of the URLLC scenario.

Grant-free transmission is able to solve the signaling cost and delay problem caused by the schedule-based transmission. However, no matter whether UEs randomly select resources or a resource allocation manner based on semi-persistent scheduling is adopted, there inevitably exists UE conflict. Therefore, for the grant-free transmission, it is a problem to be solved in the standardization of 5G that how to tradeoff between transmission reliability and resource utilization ratio, and transmission reliability and transmission delay.

At present, there may be two solutions for implementing the grant-free transmission.

1. The base station configures a resource pool used for the grant-free transmission. When a UE has data to be transmitted, the UE randomly selects a resource for the grant-free transmission to implement uplink data transmission. The resources include at least one of: time resources, multiple access signatures, uplink demodulation reference signals.

2. The base station allocates resources for grant-free transmission for UEs adopting grant-free transmission. The resources include at least one of: time-frequency resources, multiple access signatures, uplink demodulation reference signals, when a UE needs to transmit data using the grant-free mode, the UE transmits using the resources allocated by the base station.

In the foregoing description, the time-frequency resources refer to those specially allocated for the grant-free transmission. The multiple access signatures refer to the orthogonal or non-orthogonal divided multiple access signatures, including but not limited to: orthogonal time-frequency resources, orthogonal code sequences, code books, interleave sequences, scrambling sequences, etc.

In the above two grant-free transmission manners, if the first manner is adopted to implement the grant-free transmission, the UE may operate in a connected mode (i.e. a random access procedure is completed) or a non-connected mode. Since multiple UEs select resources from the same resource pool with the same probability, collide inevitably happens to the uplink transmissions of the UEs, i.e., the multiple UEs select the same resources for the uplink data transmission. The resources include at least one of: time-frequency resources, multiple access signatures, uplink demodulation reference signals, which may degrade the reliability of the data transmission. If the second grant-free transmission manner is adopted, the base station may control the number of UEs whose data may collide through control the number of UEs allocated with the same resources, the resources include at least one of: time-frequency resources, multiple access signatures, uplink demodulation reference signals, which increases the reliability of the data transmission at a price of spectrum efficiency and resource utilization ratio.

It can be seen that, in the conventional grant-free transmission manners, the first manner may degrade the reliability of the data transmission. The second manner may decrease the spectrum efficiency and spectrum utilization ratio. Thus, the convention grant-free transmission cannot reach a balance between the data transmission reliability and spectrum utilization ratio.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may transmit resource allocation information for grant-free transmission, receive uplink data from a terminal on grant-free transmission resources, if a dedicate resource request indicator is received from the terminal, allocate dedicated resources for the terminal, and indicating dedicated resource allocation information to the terminal, and receive subsequent uplink data of the terminal on the dedicated resources. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may receive resource allocation information for a grant-free transmission from a base station, transmit uplink data using grant-free transmission resources according to the resource allocation information to the base station, if the transmission of the uplink data cannot be completed within a predefined number of uplink data transmissions, transmit a dedicated resource request indicator to the base station, receive dedicated resource allocation information from the base station, and transmit subsequent uplink data on dedicated resources corresponding to the dedicated resource allocation information to the base station. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

To make the objectives, technical means and advantages of the present application clearer, the present application will be further described below in details with reference to the accompanying drawings.

The rapid development of information industry, particularly the increasing demand from the mobile Internet and the Internet of Things (IoT), brings about unprecedented challenges in the future mobile communications technology. According to the ITU-R M. [IMT.BEYOND 2020.TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing. In response to this unprecedented challenge, the communications industry and academia have prepared for 2020s by launching an extensive study of the fifth generation of mobile communications technology (5G). Currently, in ITU-R M. [IMT.VISION] from ITU, the framework and overall objectives of the future 5G have been discussed, where the demands outlook, application scenarios and various important performance indexes of 5G have been described in detail. In terms of new demands in 5G, the ITU-R M. [IMT.FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

The performance of random access directly influences the user's experience. For a conventional radio communication system, for example, in LTE or LTE-A, the random access process is used in various scenarios such as establishment of an initial link, cell handover, reestablishment of an uplink, Radio Resource Control (RRC) connection reestablishment, and is classified into contention-based random access and contention-free random access depending upon whether a UE exclusively occupies preamble sequence resources. Since, for the contention-based random access, each UE selects a preamble sequence from same preamble sequence resources when trying to establish an uplink, there may be a case in which multiple UEs select and transmit a same preamble sequence to the base station. Therefore, the conflict resolution mechanism becomes an important research direction in the random access. How to reduce the conflict probability and how to quickly solve a conflict that has occurred are key indications influencing the random access performance.

The contention-based random access process in LTE-A includes four steps, as shown in FIG. 5. In the first step, a UE randomly selects a preamble sequence from a preamble sequence resource pool and transmits the preamble sequence to a base station. The base station performs correlation detection on the received signal, so as to identify the preamble sequence transmitted by the UE. In the second step, the base station transmits a Random Access Response (RAR) to the UE, the RAR containing an identifier of a random access preamble sequence, a timing advance (TA) instruction determined according to a time delay estimation between the UE and the base station, a Cell-Radio Network Temporary Identifier (TC-RNTI), and time-frequency resources assigned for the UE to perform uplink transmission next time. In the third step, the UE transmits a third message, i.e., a Message 3 (Msg3), to the base station according to the information in the RAR. The Msg3 contains information such as a UE terminal identifier and an RRC link request, wherein the UE terminal identifier is an identifier that is unique to the UE and used for resolving conflict. In the fourth step, the base station transmits a conflict resolution identifier to the UE, the conflict resolution identifier containing a UE identifier corresponding to a UE who wins in the conflict resolution. The UE upgrades TC-RNTI to C-RNTI upon detecting its identifier, and transmits an Acknowledgement (ACK) signal to the base station to complete the random access process and waits for the scheduling of the base station. Otherwise, the UE will start a new random access process after a certain delay.

For a contention-free random access process, since the base station has known the identifier of the UE, it can assign a preamble sequence to the UE. Thus, when transmitting a preamble sequence, the UE does not need to randomly select a sequence, and instead, it uses the assigned preamble sequence. Upon detecting the assigned preamble sequence, the base station will transmit a corresponding RAR, the RAR including information such as TA and uplink resource assignment. Upon receiving the RAR, the UE considers that the uplink synchronization has been completed, and waits for the further scheduling of the base station. Therefore, the contention-free random access process contains only two steps: a first step of transmitting a preamble sequence, and a second step of transmitting an RAR.

The random access process in LTE is applicable to the following scenarios:

1. initial access under RRC_IDLE;
2. reestablishment of RRC connection;
3. cell handover;
4. in an RRC connected state, the downlink data reaches and a random access process is requested (when the uplink is nonsynchronous);
5. in an RRC connected state, the uplink data reaches and a random access process is requested (when the uplink is nonsynchronous or no resource is assigned for a scheduling request in a PUCCH resource); and
6. positioning.

In the LTE, the six scenarios use the same random access steps. In some scenarios, for example, after a UE transmits a random access preamble, the base station may use multiple different uplink receiving beams to receive the random access preamble, and finally selects an uplink receiving beam having the best receiving effect (e.g., the maximum receiving power). Therefore, preambles transmitted by different UEs may be finally received by different uplink receiving beams. In a multi-beam system at above 6 GHz, when the base station performs handover between different uplink receiving beams (especially analog beams), it is likely to result in certain delay loss and hardware loss. Thus, it is necessary to prevent the base station from frequently performing handover between different uplink receiving beams and thus resulting in delay loss not to be neglected.

In the discussion of the existing technologies, in the RAR, a base station transmits an uplink transmission grant to the detected UE. The uplink grant may contain 10 bits of fixed-size resource allocation information and 1 bit of UL delay. By using a fixed time indication, in a first uplink subframe after at least six subframes when an RAR is received, a PUSCH is found to transmit data. If the uplink delay is indicated as 1, the selected uplink subframe is postponed by one subframe. In an existing design, the UL delay is fixedly carried in the uplink grant and has only two values, i.e., 0 or 1. Apparently, the setting of the UL delay is not flexible, so that the data transmission and reception performances are influenced. Meanwhile, no processing is performed for different uplink receiving beams in the existing design, it is possible to receive different uplink receiving beams at the same time, or data from different UEs may not be received.

The present invention provides several novel data transmission methods, which provide new choices for carrying the UL delay parameter. Further, preferably, it is also possible that a base station can instruct UEs using a same uplink receiving beam to transmit data at the same time as far as possible, so that the number of beam handover by the base station is decreased and the delay and the hardware loss are reduced. Based on the number of available uplink resources and the number of available uplink receiving beams, the base station can determine how many different pieces of time to which UEs are to be assigned to perform transmission. For UEs using a same uplink receiving beam, the criterion for distinguishing them is as follows: distinguishing them in frequency domain first and then in time domain. The uplink delay can also be carried by extending the number of bits for the uplink delay, or by changing the format of the Downlink Control Information (DCI), or by changing the structure of an MAC header of an RAR or in other methods. Resource assignment information (especially temporal information) required by UEs to transmit an Msg3 is informed to the UEs. In the present application, UEs using a same uplink receiving beam refer to that the base station uses a same uplink receiving beam to receive the signals transmitted by these UEs.

Embodiment 1

In this embodiment, description will be given to the determination of the time for uplink transmission by the value of k1 predefined or configured by the system and a UL delay configured in an uplink grant, i.e., k1+UL delay, wherein the UL delay is carried in a random access response grant (RAR grant).

Most basically, a method for transmitting uplink data on the UE side comprises steps of: in a multi-beam transmission system, receiving, by a UE, an RAR transmitted to the UE by a base station, and extracting a UL delay parameter from an uplink grant in the RAR; and, determining, by the UE and according to a time unit index n, k1 and the UL delay parameter, the time to transmit an Msg3 in the random access process of the UE, and transmitting the Msg3 according to the determined transmission time, wherein the n is a time unit index of the RAR or a time unit index indicating a downlink control channel of the RAR.

A method for receiving uplink data on the base station side comprises steps of: in a multi-beam transmission system, transmitting, by a base station, an RAR to a UE, and adding a UL delay parameter to an uplink grant carried in the RAR; and, determining, by the base station and according to the time unit index n, k1 and the UL delay parameter, the time to transmit an Msg3 in the RAR of the UE, and receiving the Msg3 according to the determined transmission time.

Specifically, after the transmission time is determined, the processing on the time to transmit and receive data by the UE and the base station can be performed as desired. For example, the following two methods can be employed: in the first method, the UE transmits data in advance according to the transmission time, and the base station receives data at the determined transmission time; and in the other method, the UE transmits data at the determined transmission time, and the base station determines the reception time by considering a transmission delay and then receives data at the corresponding reception time.

The processing on the UE side and the processing on the base station side will be described below in detail.

Firstly, the processing after the UE transmits a random access request will be briefly described.

The UE determines an RA-RNTI according to a resource assigned for the transmission of a random access request; and, the UE searches for corresponding downlink control channel information by the RA-RNTI and then searches for, according to the downlink control channel information, an RAR transmitted to the UE itself at a corresponding downlink shared channel position. The downlink control channel information comprises the downlink shared channel position of the RAR. If a RAPID matched by a random access preamble transmitted by the UE itself is detected in the corresponding downlink shared channel, it is determined that the RAR carried in this downlink shared channel is an RAR transmitted to this UE. Upon receiving the RAR, the UE determines, according to an uplink grant in the RAR, a resource position for transmitting an Msg3, and transmits the Msg3 at the corresponding resource position.

In the random access process, the base station will try to receive the random access preamble transmitted by a UE by using multiple uplink receiving beams. Therefore, for some UEs, better receiving effect (e.g., higher receiving power) may be achieved by using a certain uplink receiving beam; while for other UEs, better receiving effect may be achieved by using another uplink receiving beam. As shown in FIG. 6, a UE1 and a UE3 are detected when they use an uplink receiving beam 1 for reception, while a UE2 and a UE4 are detected when they use an uplink receiving beam 3 for reception. Then, the base station will transmit an RAR to the detected UEs, and assign, in the RAR, an uplink grant for the detected UEs to transmit an Msg3. Considering the characteristics of analog beams in a beamforming system, preferably, UEs using a same uplink receiving beam may be assigned to a same time range, so that it is advantageous for the base station to receive the Msg3.

In the random access process, the uplink transmission time after a UE transmits a random access preamble is determined by the following situations.

1. If the UE searches for corresponding downlink control channel information by an RA-RNTI, the downlink control channel information will indicate the specific position of a downlink shared channel for an RAR message. Since the time unit for the downlink control channel may be different from the time unit for the corresponding downlink shared channel, the system can have the following two configurations:

the time unit (e.g., a subframe) for the downlink control channel is denoted by n; or, the time unit (e.g., a subframe) for the downlink shared channel is denoted by n Meanwhile, in the corresponding downlink shared channel, the UE correctly detects an RAPID matched with a random access preamble transmitted by this UE. In this case, the UE should determine the time to transmit an Msg3 according to an uplink grant (i.e., an RAR grant) in the RAR and based on n, k1 and a UL delay parameter. For example, a first available uplink time unit following n+k1 can be determined first (in this embodiment, the time unit is represented by a subframe), several time units corresponding to the UL delay parameter are delayed based on this time unit, and the Msg3 is transmitted at the corresponding time, wherein the UE's common delay k1 can be configured in the following ways.

a. The value is preset by the system. The system presets the value of k1 according to a transmission delay, a processing delay and a possible frame structure. If k1>6, it is indicated that the UE transmits an Msg3 after six subframes where the correct RAR is received (or in a first uplink subframe after at least six subframes).

b. The value is configured by the system. The system sets the value of k1 according to a transmission delay, a processing delay and a possible frame structure, and informs the UE of this value in a system message, for example, an MIB, an SIB or an RRC higher-layer signaling. The UE acquires the value of k1 from the system configuration information. If k1>6, it is indicated that the UE transmits an Msg3 after six subframes where the correct RAR is received (or in a first uplink subframe after at least six subframes).

In this embodiment, further, the time to transmit the Msg3 is finely tuned by the UL delay. Specifically, the UL delay value can be informed to the UE by an RAR grant (i.e., a UL grant), so that the UE obtains information about adjustment (postponement) of the time to transmit an Msg3 and then transmits the Msg3 at different time (i.e., a different UL delay value). Preferably, based on the principle that UEs using a same uplink receiving beam are distinguished in the frequency domain (at the same time) as far as possible and the condition of available uplink resources (if frequency-domain resources at a certain moment of time are limited but multiple UEs use a same uplink receiving beam, the UEs are distinguished in the frequency domain and then in the time domain), a specific value of the UL delay parameter is configured. The specific configuration method of the UL delay can be as follows:

a. the value is directly assigned, that is, the bit value of the UL delay represents how many time units to postpone; and b. a parameter correspondence table is set, and the specific number of time units to postpone is obtained by looking up the table according to the UL delay value.

The specific number of bits of the UL delay can be determined based on the maximum number of uplink receiving beams owned by the base station and the number of available uplink resources. If it is assumed that the base station has M available uplink receiving beams and the uplink resources corresponding to each uplink receiving beam occupy N time units to distinguish UEs, at least V bits indicate different uplink delays, wherein the N is calculated by:

$$V=\lceil \log_2 \Sigma_{i=1}^{M}(N_i) \rceil,$$

where $\lceil x \rceil$ denotes a minimum integer not less than x, i denotes the $i^{th}$ uplink receiving beam, and $N_i$ denotes the number of time units required by the $i^{th}$ uplink beam. For example, when the base station has at most five uplink receiving beams and each uplink receiving beam at most occupies one time unit, three bits are required to indicate possible uplink delays.

As shown in Table 1, when the UL delay value is 2 bits, the UE is likely to have four delay situations, i.e., postponing by 0, 1, 2 and 3 time units, respectively. The time unit can be one subframe, one symbol or a symbol group consisting of multiple symbols. In this embodiment, unless otherwise specified, the time unit is represented by one subframe.

TABLE 1

Examples of the UL delay value

| UL delay value | # of time unit to postpone |
|---|---|
| 00 | 0 |
| 01 | 1 |
| 10 | 2 |
| 11 | 3 |

Preferably, the setting of the UL delay value is transparent to a UE, that is, the UE does not need to know whether the uplink is postponed for different uplink receiving beams or for insufficient frequency-domain resources in a single time unit. The UE only needs to determine the time to transmit an Msg3 according to the given time indication (the values of k1 and of the UL delay). Of course, the method for determining the value of the UL delay parameter by the base station is merely an example, and the specific value of the UL grant parameter can be determined in other ways.

2. When a UE finds, in the nth subframe, an RAR transmitted by the base station (that is, the RA-RNTI successfully descrambles one piece of downlink control channel information), but the corresponding downlink shared channel information does not contain a preamble ID matched with the preamble transmitted by this UE, the UE needs to operate according to a higher-layer indication, for example, the higher layer requires the UE to retransmit the preamble.

3. When a UE has not searched for any RAR till the last subframe (represented by the nth subframe) within an RAR window, the UE needs to operate according to a higher-layer indication, for example, the higher layer requires the UE to retransmit the preamble.

FIG. 7 shows a schematic flowchart of determining the time to transmit an Msg3 by a UE according to Embodiment 1.

Embodiment 2

In this embodiment, description will be given to the determination of the time for uplink transmission by the value of k1 predefined or configured by the system, and a UL delay configured in the Downlink Control Channel Information (DCI) and/or configured in uplink grant, i.e., k1+UL delay, wherein the UL delay is carried in the DCI information, for example, in the DCI format 1A.

Most basically, a method for transmitting uplink data on the UE side comprises steps of: in a multi-beam transmission system, receiving, by a UE, downlink control channel information transmitted to this UE by a base station, and extracting a UL delay parameter from the downlink control channel information; and, receiving, by the UE and according to an indication of the downlink control information, an RAR grant transmitted to the UE, determining, according to a time unit index n, k1 and the UL delay parameter, the time to transmit uplink data by the UE, and transmitting the uplink data according to the determined transmission time.

A method for receiving uplink data on the base station side comprises steps of: in a multi-beam transmission system, transmitting, by a base station, downlink control channel information to a UE, and carrying a UL delay parameter in the downlink control channel information; transmitting, by the base station and at a resource position indicated by the downlink control channel information, an RAR grant to the UE; and, determining, by the base station and according to a time unit index n, k1 and the UL delay parameter, the time to transmit uplink data by the UE, and receiving the uplink data according to the determined transmission time.

Specifically, after the transmission time is determined, the processing on the time to transmit and receive data by the UE and the base station can be performed as desired. For example, the following two methods can be employed: in the first method, the UE transmits data in advance according to the transmission time, and the base station receives data at the determined transmission time; and in the other method, the UE transmits data at the determined transmission time, and the base station determines the reception time by considering a transmission delay and then receives data at the corresponding reception time.

The processing on the UE side and the processing on the base station side will be described below in detail.

In the random access process, the base station will try to receive the random access preamble transmitted by a UE by using multiple uplink receiving beams. Therefore, for some UEs, the better receiving effect (e.g., higher receiving power) may be achieved by using an uplink receiving beam; while for other UEs, the better receiving effect may be achieved by using another uplink receiving beam. As shown in FIG. 6, a UE1 and a UE3 are detected when they use an uplink receiving beam 1 for reception, while a UE2 and a UE4 are detected when they use an uplink receiving beam 3 for reception. Then, the base station will transmit an RAR to the detected UEs, and assign, in the RAR, an uplink grant for the detected UEs to transmit an Msg3. Considering the characteristics of analog beams in a beamforming system, preferably, UEs using a same uplink receiving beam may be assigned to a same time range, so that it is advantageous for the base station to receive the Msg3.

In the random access process, the uplink transmission time after a UE transmits a random access preamble is determined by the following situations.

1. If the UE searches for corresponding downlink control channel information by an RA-RNTI, the downlink control channel information will indicate the specific position of a downlink shared channel of an RAR message. Since the time unit for the downlink control channel may be different from the time unit for the corresponding downlink shared channel, the system can have the following two configurations:

the time unit (e.g., a subframe) for the downlink control channel is denoted by n; or, the time unit (e.g., a subframe) for the downlink shared channel is denoted by n.

Meanwhile, in the corresponding downlink shared channel, the UE correctly detects an RAPID matched with a random access preamble transmitted by this UE. In this case, the UE should determine the time to transmit an Msg3 according to an uplink grant (i.e., an RAR grant) in the RAR and based on n, k1 and a UL delay parameter. For example, a first available uplink time unit following n+k1 can be determined first (in this embodiment, the time unit is represented by a subframe), several time units corresponding to the UL delay parameter are delayed based on this time unit, and the Msg3 is transmitted at the corresponding time, wherein the UE's common delay k1 can be configured in the following ways.

a. The value is preset by the system. The system presets the value of k1 in advance according to a transmission delay, a processing delay and a possible frame structure. For example, if k1>6, it is indicated that the UE transmits an Msg3 after six subframes where the correct RAR are received (or in a first uplink subframe after at least six subframes).

b. The value is configured by the system. The system sets the value of k1 according to a transmission delay, a processing delay and a possible frame structure, and informs the UE of this value in a system message, for example, an MIB, an SIB or an RRC higher-layer signaling. The UE acquires the value of k1 from the downlink-received system configuration information. If k1>6, it is indicated that the UE transmits an Msg3 after six subframes where the correct RAR is received (or in a first uplink subframe after at least six subframes).

In this embodiment, further, the time to transmit the Msg3 is finely tuned by the UL delay. Specifically, the time to transmit the Msg3 can be indicated to the UE by the downlink control channel. That is, a UL delay parameter is added to a DCI format of the downlink shared channel, and the UE can determine the position of the time to transmit the Msg3 through the UL delay parameter. Preferably, based on the principle that UEs using a same uplink receiving beam are distinguished in the frequency domain (at the same time)

as far as possible and the condition of available uplink resources (if frequency-domain resources at a certain moment of time are limited but multiple UEs use a same uplink receiving beam, the UEs are distinguished in the frequency domain and then in the time domain), a specific value of the UL delay parameter is configured.

As shown in FIG. 8, after a UE transmits a random access preamble, the UE searches for possible downlink control channel information within a random access detection window by using an RA-RNTI. In this embodiment, each downlink control channel carries one UL delay parameter indication, indicating that all UEs contained in the RAR corresponding to the downlink control channel determine the time to transmit an Msg3 by using this UL delay indication. The UE detects all possible RAR to find a UL delay parameter transmitted to this UE. For example, if the UE correctly detects a downlink control channel by using the RA-RNTI but does not find an RAPID matched with the transmitted preamble, the UE needs to continuously search within the detection window. This UE is likely to detect another downlink control channel in which an RAPID matched with the transmitted preamble can be found. Thus, the UE uses the corresponding UL delay parameter in this downlink control channel to determine the time to transmit the Msg3.

In addition, if the base station is beam reciprocal, the downlink transmitting beams and uplink receiving beams of the base station can be determined relatively to each other. In other words, if multiple UEs request the random access in a same random access transmission resource, it means that the multiple UEs use a same downlink transmitting beam. However, since the downlink transmitting beams and the uplink receiving beams can be determined relatively to each other, it means that the multiple UEs use a same uplink receiving beam. Thus, within a specified random access transmission resource, the base station can use only one uplink receiving beam as long as the multiple UEs have a same RA-RNTI. Accordingly, the whole UE group can be informed by adding a UL delay parameter in a downlink control channel within the random access detection window. In this case, preferably, the base station does not need to add an additional UL delay parameter to the uplink grant.

If the base station is not beam reciprocal, the downlink transmitting beams and uplink receiving beams of the base station cannot be determined relatively to each other. Thus, the base station can perform detection within a specified random access resource by polling uplink beams. That is, the base station may use multiple uplink receiving beams. In this case, even if multiple UEs have a same RA-RNTI, the corresponding uplink receiving beams may be different. Therefore, different downlink control channel information will be prepared to carry different UL delay information, but will be scrambled by a same RA-RNTI. In this case, preferably, the base station can add another UL delay parameter to the uplink grant.

The specific number of bits of the UL delay can be determined based on the maximum number of uplink receiving beams owned by the base station and the number of available uplink resources. If it is assumed that the base station has M available uplink receiving beams and the uplink resources corresponding to each uplink receiving beam occupy N time units to distinguish UEs, at least V bits indicate different uplink delays, wherein the N is calculated by:

$$V=\lceil \log_2 \Sigma_{i=1}^{M}(N_i) \rceil,$$

where $\lceil x \rceil$ denotes a minimum integer not less than x, i denotes the $i^{th}$ uplink receiving beam, and $N_i$ denotes the number of time units required by the $i^{th}$ uplink beam. For example, when the base station has at most five uplink receiving beams and each uplink receiving beam at most occupies one time unit, three bits are required to indicate possible uplink delays.

Particularly, when the base station configures, in the downlink control channel, a UL delay1 for a UE group by the method described in this embodiment and also configures, in the uplink grant of the RAR, a UL delay2 for individual UEs for the purpose of adjustment, the calculation of the bits of the UL delay can be divided into two parts. Specifically, the calculation of the number (denoted by $V_1$) of bits of the UL delay for the UE group can be based on M available uplink receiving beams, that is:

$$V_1=\lceil \log_2 M \rceil,$$

The calculation of the specific number (denoted by $V_2$) of bits of the UL delay for each UE can be based on the condition of uplink resources (i.e., load condition) for a single uplink receiving beam, and the UEs are distinguished by indicating that uplink resources required by one uplink receiving beam occupy N time units, then:

$$V_2=\lceil \log_2 n \rceil,$$

If the number of time units required by different uplink receiving beams is different, the value of N is the maximum number of the required time units.

Correspondingly, during the determination of the time to transmit the Msg3, for example, the time to transmit the Msg3 is determined as n+k1+UL delay1+UL delay2, according to a UE's common delay k1, the UL delay1 and the UL delay2. The configuration method of the UL delay can be as follows:

the value is directly assigned, that is, the bit value of the UL delay/UL delay1/UL delay2 represents how many time units to postpone; and a parameter correspondence table is set, and the specific number of time units to postpone is obtained by looking up the table according to the value of the UL delay/UL delay1/UL delay2.

As shown in Table 1, when the value of the UL delay is 2 bits, the UE is likely to have four delay situations, i.e., postponing by 0, 1, 2 and 3 time units, respectively. The time unit can be one subframe, one slot, one symbol or a symbol group consisting of multiple symbols. In this embodiment, unless otherwise specified, the time unit is represented by a subframe.

As shown in Table 2, when the value of the UL delay is 2 bits, the UE is likely to have three delay situations, i.e., postponing by 0, 1 and 2 time units, respectively; and meanwhile, one of the values can be defined as a reserved value.

TABLE 2

Examples of the UL delay value (including the reserved value)

| UL delay value | # of time unit to postpone |
|---|---|
| 00 | Reserved (null) |
| 01 | 0 |
| 10 | 1 |
| 11 | 2 |

Preferably, the setting of the UL delay value is transparent to a UE, that is, the UE does not need to know whether the uplink is postponed for different uplink receiving beams or for insufficient frequency-domain resources in a single time unit. The UE only needs to determine the time to transmit an Msg3 according to the given time indication (the values of k1 and of the UL delay). Of course, the method for determining the value of the UL delay parameter by the base station is merely an example, and the specific value of the UL grant parameter can be determined in other ways.

2. When a UE finds, in the nth subframe, an RAR transmitted by the base station (that is, the RA-RNTI successfully descrambles one piece of downlink control channel information), but the corresponding downlink shared channel information does not contain a preamble ID matched with the preamble transmitted by this UE, the UE needs to operate according to a higher-layer indication:

a) the higher layer requires the UE to stop detecting and retransmit the preamble; and b) if the random access detection window has not yet ended, the higher layer requires the UE to continuously detect possible RAR.

3. When a UE has not searched for any RAR till the last subframe (represented by the nth subframe) within an RAR window, the UE needs to operate according to a higher-layer indication, for example, the higher layer requires the UE to retransmit the preamble.

FIG. 9 shows a schematic flowchart of determining, by a UE, the time to transmit an Msg3 in this embodiment. In this example, the value of k1 is informed by a system message, and UL delays are configured in the downlink control channel information and the corresponding RAR grant (i.e., the uplink grant).

Embodiment 3

In this embodiment, description will be given to the determination of the time for uplink transmission by the value of k1 predefined or configured by the system and a UL delay parameter informed in an RAR grant, i.e., the determination of the transmission time according to the k1+UL delay, wherein the UL delay is carried in a redefined MAC header of the RAR message.

Most basically, a method for transmitting uplink data on the UE side comprises steps of: in a multi-beam transmission system, receiving, by a UE, an RAR message transmitted to the UE by a base station, and extracting, from a random access layer MAC header of the RAR message, a UL delay parameter transmitted to the UE; and, determining, by the UE and according to a time unit index n, k1 and the UL delay parameter, the time to transmit an Msg3 in the random access process of the UE, and transmitting the Msg3 according to the determined transmission time.

A method for receiving uplink data on the base station side comprises steps of: in a multi-beam transmission system, transmitting, by a base station, an RAR message to a UE, and carrying a first UL delay parameter in an MAC header of the RAR message; and, determining, by the base station and according to a time unit index n, k1 and the UL delay parameter, the time to transmit an Msg3 in the random access process of the UE, and receiving the Msg3 according to the determined transmission time.

Specifically, after the transmission time is determined, the processing on the time to transmit and receive data by the UE and the base station can be performed as desired. For example, the following two methods can be employed: in the first method, the UE transmits data in advance according to the transmission time, and the base station receives data at the determined transmission time; and in the other method, the UE transmits data at the determined transmission time, and the base station determines the reception time by considering a transmission delay and then receives data at the corresponding reception time.

The processing on the UE side and the processing on the base station side will be described below in detail.

In the random access process, the base station will try to receive the random access preamble transmitted by a UE by using multiple uplink receiving beams. Therefore, for some UEs, better receiving effect (e.g., higher receiving power) may be achieved by using an uplink receiving beam; while for other UEs, better receiving effect may be achieved by using another uplink receiving beam. As shown in FIG. 6, a UE1 and a UE3 are detected when they use an uplink receiving beam 1 for reception, while a UE2 and a UE4 are detected when they use an uplink receiving beam 3 for reception. Then, the base station will transmit an RAR to the detected UEs, and assign, in the RAR, an uplink grant for the detected UEs to transmit an Msg3. Considering the characteristics of analog beams in a beamforming system, preferably, UEs using a same uplink receiving beam may be assigned to a same time range, so that it is advantageous for the base station to receive the Msg3.

In the random access process, the uplink transmission time after a UE transmits a random access preamble is determined by the following situations.

1. If the UE searches for corresponding downlink control channel information by an RA-RNTI, the downlink control channel information will indicate the specific position of a downlink shared channel for an RAR message. Since the time unit for the downlink control channel may be different from the time unit for the corresponding downlink shared channel, the system can have the following two configurations:

the time unit (e.g., a subframe) for the downlink control channel is denoted by n; or, the time unit (e.g., a subframe) for the downlink shared channel is denoted by n.

Meanwhile, in the corresponding downlink shared channel, the UE correctly detects an RAPID matched with a random access preamble transmitted by this UE. In this case, the UE should determine the time to transmit an Msg3 according to an uplink grant (i.e., an RAR grant) in the RAR and based on n, k1 and a UL delay parameter. For example, a first available uplink time unit following n+k1 can be determined first (in this embodiment, the time unit is represented by a subframe), several time units corresponding to the UL delay parameter are delayed based on this time unit, and the Msg3 is transmitted at the corresponding time, wherein the UE's common delay k1 can be configured in the following ways.

a. The value is preset by the system. The system sets the value of k1 in advance according to a transmission delay, a processing delay and a possible frame structure. For example, if k1>6, it is indicated that the UE transmits an Msg3 after six subframes where the correct RAR is received. (or in a first uplink subframe after at least six subframes)

b. The value is configured by the system. The system sets the value of k1 according to a transmission delay, a processing delay and a possible frame structure, and informs the UE of this value in a system message, for example, an MIB, an SIB or an RRC higher-layer signaling. The UE acquires the value of k1 from the downlink-received system configuration information. If k1>6, it is indicated that the UE transmits an Msg3 after six subframes where the correct RAR is received (or in a first uplink subframe after at least six subframes).

In this embodiment, further, the time to transmit the Msg3 is finely tuned by the UL delay. Specifically, a UL delay parameter can be added to the downlink shared channel, and the UE can determine the position of the time to transmit the Msg3 through the UL delay parameter. Preferably, based on the principle that UEs using a same uplink receiving beam are distinguished in the frequency domain (at the same time) as far as possible and the condition of available uplink resources (if frequency-domain resources at a certain moment of time are limited but multiple UEs use a same uplink receiving beam, the UEs are distinguished in the frequency domain and then in the time domain), the base station configures a specific value of the UL delay parameter. In this embodiment, the UL delay parameter is informed by adding it to the MAC header of the RAR. As shown in FIG. 9, the MAC header will contain multiple MAC subheaders which are expressed as follows:

E is 1 bit, wherein, if E=0, it is indicated that an RAR or padding information is contained after this subheader; and if E=1, it is indicated that one MAC subheader carrying the RAPID or a UL delay parameter is at least contained after this subheader;

T is 1 bit, wherein a criterion for distinguishing is as follows: the T in the first subheader represents a back-off indication (T=0) or a UL delay parameter (T=1), and the T in other subheaders represents a UL delay parameter (i.e. T=0) or an RAPID (i.e. T=1);

R is a reserved bit;

BI is a 4-bit back-off indication;

the UL delay is a 6-bit UL delay indication; and the RAPID is a 6-bit RAPID.

In this embodiment, there are three format settings for the MAC subheaders:

format 1: the structure is E/T/R/R/BI;

format 2: the structure is E/T/UL delay, and format 3: the structure is E/T/RAPID.

Since the format 1 may not present in the MAC header, there are following two situations.

The first MAC subheader is in the format 1, as shown in FIG. 10.

The process of reading a message in the MAC header by a UE is described as below.

Step 1: First two bits of the first subheader are read as 10, that is, E=1 and T=0. Thus, it is indicated that there is at least one subheader carrying the RAPID or the UL delay after the first subheader, and the first subheader contains a back-off indication. The 4-bit back-off indication is read.

Step 2: First two bits of the second subheader are read as 10, that is, E=1 and T=0. Thus, it is indicated that there is at least one subheader carrying the RAPID or the UL delay after this subheader, and this subheader contains a UL delay parameter. The 6-bit uplink delay is read.

Step 3: The subsequent subheaders are read successively. When the UE has searched for an RAPID matched with the preamble transmitted by this UE, the time for subsequent uplink transmission is determined according to the read UL delay indication closest to the RAPID.

b) The first MAC subheader is in the format 2, as shown in FIG. 11.

The process of reading a message in the MAC header by a UE is described as below.

Step 1: First two bits of the first subheader are read as 11, that is, E=1 and T=1. Thus, it is indicated that there is at least one subheader carrying the RAPID or the UL delay after this subheader, and this subheader contains a UL delay parameter. The 6-bit uplink delay is read.

Step 2: The subsequent subheaders are read successively. When the UE has searched for an RAPID matched with the preamble transmitted by this UE, the transmission time for subsequent uplink transmission is determined according to the read UL delay indication closest to the RAPID.

Possible downlink control channel information is searched within the random access detection window by using the RA-RNTI. In this embodiment, the MAC header information may carry one or more UL delay parameter indications. Specifically:

If the base station is beam reciprocal, the downlink transmitting beams and uplink receiving beams of the base station can be determined relatively to each other. In other words, if multiple UEs request the random access in a same random access transmission resource, it means that the multiple UEs use a same downlink transmitting beam. However, since the downlink transmitting beams and the uplink receiving beams can be determined relatively to each other, it means that the multiple UEs use a same uplink receiving beam. Thus, within a specified random access transmission resource, the base station can use only one uplink receiving beam as long as the multiple UEs have a same RA-RNTI. Accordingly, all UEs in the RAR can be informed by adding a UL delay parameter to the RAR.

If the base station is not beam reciprocal, the downlink transmitting beams and uplink receiving beams of the base station cannot be determined relatively to each other. Thus, the base station can perform detection within a specified random access resource by polling uplink beams. That is, the base station may use multiple uplink receiving beams. In this case, even if multiple UEs have a same RA-RNTI, the corresponding uplink receiving beams may be different. Therefore, multiple MAC headers carrying UL delay parameters can be added to the MAC header in the RAR, and random access preamble subheaders after each UL delay subheader are all applied to the UL delay indication till reaching another subheader containing the UL delay.

The specific number of bits of the UL delay can be determined based on the maximum number of uplink receiving beams owned by the base station and the number of available uplink resources. If it is assumed that the base station has M available uplink receiving beams and the uplink resources corresponding to each uplink receiving beam occupy N time units to distinguish UEs, at least V bits indicate different uplink delays, wherein the N is calculated by:

$$V=\lceil \log_2 \Sigma_{i=1}^{M}(N_1) \rceil,$$

where $\lceil x \rceil$ denotes a minimum integer not less than x, i denotes the $i^{th}$ uplink receiving beam, and $N_i$ denotes the number of time units required by the $i^{th}$ uplink beam. For example, when the base station has at most five uplink receiving beams and each uplink receiving beam at most occupies one time unit, three bits are required to indicate possible uplink delays.

Particularly, when the base station configures, in the downlink control channel, a UL delay1 for a UE group by the method described in this embodiment and also configures, in the uplink grant of the RAR, a UL delay2 for individual UEs for the purpose of adjustment, the calculation of the bits of the UL delays can be divided into two parts. Specifically, the calculation of the number (denoted by $V_1$) of bits of the UL delay for the UE group can be based on M available uplink receiving beams, that is:

$$V_1=\lceil \log_2 M \rceil,$$

The calculation of the specific number (denoted by $V_2$) of bits of the UL delay for each UE can be based on the condition of uplink resources (i.e., load condition) of a single uplink receiving beam, and the UEs are distinguished by indicating that uplink resources required by one uplink receiving beam occupy N time units, then:

$V_2 = \lceil \log_2 N \rceil$,

If the number of time units required by different uplink receiving beams is different, the value of N is the maximum number of the required time units.

Correspondingly, during the determination of the time to transmit the Msg3, for example, the time to transmit the Msg3 is determined as n+k1+UL delay1+UL delay2, according to a UE's common delay k1, the UL delay1 and the UL delay2. The configuration method of the UL delay can be as follows:

the value is directly assigned, that is, the bit value of the UL delay/UL delay1/UL delay2 represents how many time units to postpone; and a parameter correspondence table is set, and the specific number of time units to postpone is obtained by looking up the table according to the value of the UL delay/UL delay1/UL delay2.

In this embodiment, there are 6 bits of the UL delay in the MAC subheaders, and at most 64 different delay situations can be indicated. Preferably, the setting of the UL delay value is transparent to a UE, that is, the UE does not need to know whether the uplink is postponed for different uplink receiving beams or for insufficient frequency-domain resources in a single time unit. The UE only needs to determine the time to transmit an Msg3 according to the given time indication (the values of k1 and of the UL delay). Of course, the method for determining the value of the UL delay parameter by the base station is merely an example, and the specific value of the UL grant parameter can be determined in other ways.

2. When a UE finds, in the nth subframe, an RAR transmitted by the base station (that is, the RA-RNTI successfully descrambles one piece of downlink control channel information), but the corresponding downlink shared channel information does not contain a preamble ID matched with the preamble transmitted by this UE, the UE needs to operate according to a higher-layer indication:

a higher layer requires the UE to stop detecting and retransmit the preamble; and if the random access detection window has not yet ended, the higher layer requires the UE to continuously detect possible RAR.

3. When a UE has not searched for any RAR till the last subframe (represented by the nth subframe) within an RAR window, the UE needs to operate according to a higher-layer indication, for example, the higher layer requires the UE to retransmit the preamble.

Embodiment 4

In this embodiment, description will be given to the determination of the time for uplink transmission by the value of k1 predefined or configured by the system and a UL delay configured by a fixed-size resource allocation portion in an uplink grant, i.e., the determination of the transmission time according to k1+UL delay, wherein the UL delay is carried in the fixed-size resource allocation in the uplink grant.

Most basically, a method for transmitting uplink data on the UE side comprises steps of: in a multi-beam transmission system, receiving, by a UE, an RAR transmitted to the UE by a base station, and extracting a UL delay parameter from an uplink grant in the RAR, wherein a specified bit field in a fixed-size resource allocation indication of the uplink grant is used as the UL delay parameter; and, determining, by the UE and according to a time unit index n, k1 and the UL delay parameter, the time to transmit an Msg3 in the random access process of the UE, and transmitting the Msg3 according to the determined transmission time.

A method for receiving uplink data on the base station side comprises steps of: in a multi-beam transmission system, transmitting, by a base station, an RAR to a UE, and adding a UL delay parameter to an uplink grant carried in the RAR, wherein a specified bit field in a fixed-size resource allocation indication of the uplink grant is used as the UL delay parameter; and, determining, by the base station and according to the time unit index n, k1 and the UL delay parameter, the time to transmit an Msg3 in the random access process of the UE, and receiving the Msg3 according to the determined transmission time.

Specifically, after the transmission time is determined, the processing on the time to transmit and receive data by the UE and the base station can be performed as desired. For example, the following two methods can be employed: in the first method, the UE transmits data in advance according to the transmission time, and the base station receives data at the determined transmission time; and in the other method, the UE transmits data at the determined transmission time, and the base station determines the reception time by considering a transmission delay and then receives data at the corresponding reception time.

The processing on the UE side and the processing on the base station side will be described below in detail.

In the random access process, the base station will try to receive the random access preamble transmitted by a UE by using multiple uplink receiving beams. Therefore, for some UEs, better receiving effect (e.g., higher receiving power) may be achieved by using an uplink receiving beam; while for other UEs, better receiving effect may be achieved by using another uplink receiving beam. As shown in FIG. 6, a UE1 and a UE3 are detected when they use an uplink receiving beam 1 for reception, while a UE2 and a UE4 are detected when they use an uplink receiving beam 3 for reception. Then, the base station will transmit an RAR to the detected UEs, and assign, in the RAR, an uplink grant for the detected UEs to transmit an Msg3. Considering the characteristics of analog beams in a beamforming system, preferably, UEs using a same uplink receiving beam may be assigned to a same time range, so that it is advantageous for the base station to receive the Msg3.

In the random access process, the uplink transmission time after a UE transmits a random access preamble is determined by the following situations.

1. If the UE searches for corresponding downlink control channel information by an RA-RNTI, the downlink control channel information will indicate the specific position of a downlink shared channel for an RAR message. Since the time unit for the downlink control channel may be different from the time unit for the corresponding downlink shared channel, the system can have the following two configurations:

the time unit (e.g., a subframe) for the downlink control channel is denoted by n; or, the time unit (e.g., a subframe) for the downlink shared channel is denoted by n.

Meanwhile, in the corresponding downlink shared channel, the UE correctly detects an RAPID matched with a random access preamble transmitted by this UE. In this case, the UE should determine the time to transmit an Msg3 according to an uplink grant (i.e., a random access response grant) in the RAR and based on the n, k1 and a UL delay parameter. For example, a first available uplink time unit following n+k1 can be determined first (in this embodiment, the time unit is represented by a subframe), several time units corresponding to the UL delay parameter are delayed based on this time unit, and the Msg3 is transmitted at the corresponding time, wherein the UE's common delay k1 can be configured in the following ways.

a. The value is preset by the system. The system presets the value of k1 according to a transmission delay, a processing delay and a possible frame structure. For example, if k1>6, it is indicated that the UE transmits an Msg3 after six subframes where the correct RAR is received (or in a first uplink subframe after at least six subframes).

b. The value is configured by the system. The system sets the value of k1 according to a transmission delay, a processing delay and a possible frame structure, and informs the UE of this value in a system message, for example, an MIB, an SIB or an RRC higher-layer signaling. The UE acquires the value of k1 from the downlink-received system configuration information. If k1>6, it is indicated that the UE transmits an Msg3 after six subframes where the correct RAR is received (or in a first uplink subframe after at least six subframes).

In this embodiment, further, the time to transmit the Msg3 is finely tuned by the UL delay. Specifically, the UL delay value can be informed to the UE by an RAR grant (i.e., a UL grant), so that the UE obtains information about adjustment (postponement) of the time to transmit an Msg3 and then transmits the Msg3 at different time (i.e., a different UL delay value). Preferably, based on the principle that UEs using a same uplink receiving beam are distinguished in the frequency domain (at the same time) as far as possible and the condition of available uplink resources (if frequency-domain resources at a certain moment of time are limited but multiple UEs use a same uplink receiving beam, the UEs are distinguished in the frequency domain and then in the time domain), the base station configures a specific value of the UL delay parameter. The configuration method of the UL delay can be as follows:

a. the value is directly assigned, that is, the bit value of the UL delay represents how many time units to postpone; and b. a parameter correspondence table is set, and the specific number of time units to postpone is obtained by looking up the table according to the UL delay value.

The specific number of bits of the UL delay can be determined based on the maximum number of uplink receiving beams owned by the base station and the number of available uplink resources. If it is assumed that the base station has M available uplink receiving beams and the uplink resources corresponding to each uplink receiving beam occupy N time units to distinguish UEs, at least V bits indicate different uplink delays, wherein the N is calculated by:

$$V = \lceil \log_2 \Sigma_{i=1}^{M}(N_i) \rceil,$$

where $\lceil x \rceil$ denotes a minimum integer not less than x, i denotes the $i^{th}$ uplink receiving beam, and $N_i$ denotes the number of time units required by the $i^{th}$ uplink beam. For example, when the base station has at most five uplink receiving beams and each uplink receiving beam at most occupies one time unit, three bits are required to indicate possible uplink delays.

As shown in Table 1, when the UL delay value is 2 bits, the UE is likely to have four delay situations, i.e., postponing by 0, 1, 2 and 3 time units, respectively. The time unit can be one subframe, one slot, one symbol or a symbol group consisting of multiple symbols. In this embodiment, unless otherwise specified, the time unit is represented by one subframe. The setting of the UL delay value is transparent to a UE, that is, the UE does not need to know whether the uplink is postponed for different uplink receiving beams or for insufficient frequency-domain resources in a single time unit. The UE only needs to determine the time to transmit an Msg3 according to the given time indication (the values of k1 and of the UL delay).

Part of resource assignments contained in the UL grant (i.e., the RAR grant) are fixed-size resource allocation indications, the function of which is to indicate the time-frequency positions of uplink transmission resources assigned to the UE, including the UL delays of uplink transmission resources for the UE and the positions of PRBs in the frequency domain. Specifically, the fixed-size resource allocation indication is represented by M bits, some of which indicate the UL delay (i.e., to determine the transmission time) while the remaining of which indicate the frequency-domain position. For example, if the fixed-size resource allocation indication has 12 bits, there can be at least two settings:

two MSBs among the 12 bits indicate the UL delay value of the UE, and 10 LSBs are used for indicating the frequency-domain position of the resource assigned to the UE; and two LSBs among the 12 bits indicate the UL delay value of the UE, and 10 MSBs are used for indicating the frequency-domain position of the resource assigned to the UE.

2. When a UE finds, in the nth subframe, an RAR transmitted by the base station (that is, the RA-RNTI successfully descrambles one piece of downlink control channel information), but the corresponding downlink shared channel information does not contain a preamble ID matched with the preamble transmitted by this UE, the UE needs to operate according to a higher-layer indication, for example, the higher layer requires the UE to retransmit the preamble.

3. When a UE has not searched for any RAR till the last subframe (represented by the nth subframe) within an RAR window, the UE needs to operate according to a higher-layer indication, for example, the higher layer requires the UE to retransmit the preamble.

FIG. 12 is a schematic flowchart of determining, by a UE, the time to transmit uplink transmission (an Msg3) in this embodiment.

Embodiment 5

In this embodiment, description will be given to the determination of the time for uplink transmission by the value of k1 predefined or configured by the system and a UL delay in downlink control channel information. In other words, the method in Embodiment 2 is extended to the method for all uplink transmission resources (PUSCHs) assigned by DCI scheduling.

Most basically, a method for transmitting uplink data on the UE side comprises steps of: in a multi-beam transmission system, receiving, by a UE, downlink control channel information transmitted to this UE by a base station, and extracting a first UL delay parameter from the downlink control channel information; and, after receiving, by the UE and according to an indication of the downlink control channel information, a uplink data transmission grant transmitted to the UE, determining, according to a time unit index n, k1 and the UL delay parameter, the time to transmit uplink data by the UE, and transmitting the uplink data according to the determined transmission time.

A method for receiving uplink data on the base station side comprises steps of: in a multi-beam transmission system, transmitting, by a base station, downlink control channel information to a UE, and carrying a UL delay parameter in the downlink control channel information; transmitting, by the base station and at a resource position indicated by the downlink control channel information, an uplink data transmission grant to the UE; and, determining, by the base station and according to a time unit index n, k1 and the UL delay parameter, the time to transmit uplink data by the UE, and receiving the uplink data according to the determined transmission time.

Specifically, after the transmission time is determined, the processing on the time to transmit and receive data by the UE and the base station can be performed as desired. For example, the following two methods can be employed: in the first method, the UE transmits data in advance according to the transmission time, and the base station receives data at the determined transmission time; and in the other method, the UE transmits data at the determined transmission time, and the base station determines the reception time by considering a transmission delay and then receives data at the corresponding reception time.

The processing on the UE side and the processing on the base station side will be described below in detail.

In a beamforming system, for some UEs, the better receiving effect (e.g., higher receiving power) may be achieved by using an uplink receiving beam; while for other UEs, the better receiving effect may be achieved by using another uplink receiving beam. As shown in FIG. 6, a UE1 and a UE3 are detected when they use an uplink receiving beam 1 for reception, while a UE2 and a UE4 are detected when they use an uplink receiving beam 3 for reception. Considering the characteristics of analog beams in a beamforming system, preferably, UEs using a same uplink receiving beam may be assigned to a same time range, so that it is advantageous for the base station to receive the uplink transmission.

When a UE has searched for the downlink control channel information transmitted by the base station and the downlink control channel information indicates the position of an uplink transmission resource for the UE, for example, a UL grant is in a DCI format 0 in the LTE. The time unit (e.g., a subframe) for the downlink control channel is denoted by n. In this case, the UE should determine, according to the UL grant for scheduling data and based on the n, k1 and the UL delay parameter, the time to transmit an Msg3. For example, a first available uplink time unit following n+k1 can be determined first, several time units corresponding to the UL delay parameter are then delayed based on this time unit, and the uplink data is transmitted at the corresponding time, wherein the UE's common delay k1 can be configured as below.

a. The value is preset by the system. The system sets the value of k1 in advance according to a transmission delay, a processing delay and a possible frame structure. If k1>6, it is indicated that the UE transmits the uplink data after six subframes where the correct RAR is received (or in a first uplink subframe after at least six subframes).

b. The value is configured by the system. The system sets the value of k1 according to a transmission delay, a processing delay and a possible frame structure, and informs the UE of this value in a system message, for example, an MIB, an SIB or an RRC higher-layer signaling. The UE acquires the value of k1 from the downlink-received system configuration information. If k1>6, it is indicated that the UE transmits the uplink data after six subframes where the correct RAR is received (or in a first uplink subframe after at least six subframes).

In this embodiment, further, the time to transmit the uplink data is finely tuned by the UL delay. Specifically, the UL delay value can be informed to a UE (or a UE group) by the DCI, so that the UE obtains information about adjustment (postponement) of the time to transmit the uplink data and then transmits the uplink data at different time (i.e., a different UL delay value). Preferably, based on the principle that UEs using a same uplink receiving beam are distinguished in the frequency domain (at the same time) as far as possible and the condition of available uplink resources (if frequency-domain resources at a certain moment of time are limited but multiple UEs use a same uplink receiving beam, the UEs are distinguished in the frequency domain and then in the time domain), the base station configures a specific value of the UL delay parameter so that the UE can adjust the uplink transmission time. The configuration method of the UL delay can be as follows:

a. the value is directly assigned, that is, the bit value of the UL delay represents how many time units to postpone; and b. a parameter correspondence table is set, and the specific number of time units to postpone is obtained by looking up the table according to the value of the UL delay.

The specific number of bits of the UL delay can be determined based on the maximum number of uplink receiving beams owned by the base station and the number of available uplink resources. If it is assumed that the base station has M available uplink receiving beams and the uplink resources corresponding to each uplink receiving beam occupy N time units to distinguish UEs, at least V bits indicate different uplink delays, wherein the N is calculated by:

$$V = \lceil \log_2 \Sigma_{i=1}^{M}(N_i) \rceil,$$

where $\lceil x \rceil$ denotes a minimum integer not less than x, i denotes the $i^{th}$ uplink receiving beam, and $N_i$ denotes the number of time units required by the $i^{0'}$ uplink beam. For example, when the base station has at most five uplink receiving beams and each uplink receiving beam at most occupies one time unit, three bits are required to indicate possible uplink delays.

As shown in Table 1, when the UL delay value is 2 bits, the UE is likely to have four delay situations, i.e., postponing by 0, 1, 2 and 3 time units, respectively. The time unit can be one subframe, one slot, one symbol or a symbol group consisting of multiple symbols. In the present invention, unless otherwise specified, the time unit is represented by one subframe. The setting of the UL delay value is transparent to a UE, that is, the UE does not need to know whether the uplink is postponed for different uplink receiving beams or for insufficient frequency-domain resources in a single time unit. The UE only needs to determine the time to transmit the uplink data according to the given time indication (the values of k1 and of the UL delay). The specific method for adding the UL delay to the downlink control channel may be as follows.

a. The UL delay value is added directly into the DCI.

The DCI format carrying the UL grant contains the UL delay and is added with V-bit data of the UL delay. Additionally:

if the DCI is exclusive to a UE, the UL delay value contained in this DCI is exclusive to the UE; and/or, if the DCI is shared by a UE group (multiple UEs), all UEs in this UE group use the UL delay configuration (i.e., UL delay) contained in this DCI.

b. The value of the UL index is expanded in the DCI (both in TDD and FDD, this parameter is used for indication).

Thus, the UL index has a function of adjusting the uplink transmission time of the UE.

The value of the UL index can change based on different downlink/uplink configurations for the TDD.

c. UL delay adjustment is added to the resource allocation in the DCI.

That is, the original M bits are used to indicate the frequency-domain position, and the uplink transmission delay adjustment can be indicated by adding V Most significant bit (MSBs); or, the uplink transmission delay adjustment can be indicated by adding V Least significant bits (LSBs). That is, the number of bits of the final resource allocation is M+V.

FIG. 13 is a schematic flowchart of determining, by a UE, the time to transmit uplink transmission in this embodiment.

Embodiment 6

In this embodiment, description will be given to the determination of the time for uplink transmission only by a UL delay configured by the system, without using the value of a UE's common uplink time delay k1.

In the random access process, a base station will try to receive a random access preamble transmitted by a UE by using multiple uplink receiving beams. Therefore, for some UEs, better receiving effect (e.g., higher receiving power) may be achieved by using an uplink receiving beam; while for other UEs, better receiving effect may be achieved by using another uplink receiving beam. As shown in FIG. 6, a UE1 and a UE3 are detected when they use an uplink receiving beam 1 for reception, while a UE2 and a UE4 are detected when they use an uplink receiving beam 3 for reception. Then, the base station will transmit an RAR to the detected UEs, and assign, in the RAR, an uplink grant for the detected UEs to transmit an Msg3. Considering the characteristics of analog beams in a beamforming system, preferably, UEs using a same uplink receiving beam may be assigned to a same time range, so that it is advantageous for the base station to receive the Msg3.

In the random access process, the uplink transmission time after a UE transmits a random access preamble is determined by the following situations.

1. If the UE searches for corresponding downlink control channel information by an RA-RNTI, the downlink control channel information will indicate the specific position of a downlink shared channel for an RAR message. Since the time unit of the downlink control channel may be different from the time unit for the corresponding downlink shared channel, the system can have the following two configurations:

the time unit (e.g., a subframe) for the downlink control channel is denoted by n; or, the time unit (e.g., a subframe) for the downlink shared channel is denoted by n.

In this embodiment, further, the time to transmit the Msg3 is adjusted by the UL delay. Specifically, the UL delay value can be informed to the UE by an RAR grant (i.e., a UL grant), so that the UE obtains information about adjustment (postponement) of the time to transmit an Msg3 and then transmits the Msg3 at different time (i.e., a different UL delay value). Preferably, based on the principle that UEs using a same uplink receiving beam are distinguished in the frequency domain (at the same time) as far as possible and the condition of available uplink resources (if frequency-domain resources at a certain moment of time are limited but multiple UEs use a same uplink receiving beam, the UEs are distinguished in the frequency domain and then in the time domain), the base station configures a specific value of the UL delay parameter. The configuration method of the UL delay can be as follows:

a. the value is directly assigned, that is, the bit value of the UL delay represents how many time units to postpone; and b. a parameter correspondence table is set, and the specific number of time units to postpone is obtained by looking up the table according to the value of the UL delay.

The specific number of bits of the UL delay can be determined based on the maximum number of uplink receiving beams owned by the base station and the number of available uplink resources. If it is assumed that the base station has M available uplink receiving beams and the uplink resources corresponding to each uplink receiving beam occupy N time units to distinguish UEs, at least V bits indicate different uplink delays, wherein the N is calculated by:

$$V = \lceil \log_2 \Sigma_{i=1}^{M}(N_i) \rceil,$$

where $\lceil x \rceil$ denotes a minimum integer not less than x, i denotes the $i^{th}$ uplink receiving beam, and $N_i$ denotes the number of time units required by the $i^{th}$ uplink beam. For example, when the base station has at most five uplink receiving beams and each uplink receiving beam at most occupies one time unit, three bits are required to indicate possible uplink delays.

As shown in Table 1, when the UL delay value is 2 bits, the UE is likely to have four delay situations, i.e., postponing by 0, 1, 2 and 3 time units, respectively. The time unit can be one subframe, one slot, one symbol or a symbol group consisting of multiple symbols. In the present invention, unless otherwise specified, the time unit is represented by one subframe.

The setting of the UL delay value is transparent to a UE, that is, the UE does not need to know whether the uplink is postponed for different uplink receiving beams or for insufficient frequency-domain resources in a single time unit. The UE only needs to determine the time to transmit an Msg3 according to the given time indication (the values of k1 and of the UL delay).

2. When a UE finds, in the nth subframe, an RAR transmitted by the base station (that is, the RA-RNTI successfully descrambles one piece of downlink control channel information), but the corresponding downlink shared channel information does not contain a preamble ID matched with the preamble transmitted by this UE, the UE needs to operate according to a higher-layer indication, for example, the higher layer requires the UE to retransmit the preamble.

3. When a UE has not searched for any RAR till the last subframe (represented by the nth subframe) within an RAR window, the UE needs to operate according to a higher-layer indication, for example, the higher layer requires the UE to retransmit the preamble.

FIG. 14 is a schematic flowchart of determining, by a UE, the time to transmit an Msg3 only by a UL delay value in this embodiment. More specifically, after the transmission time is determined, the processing on the time to transmit and receive data by the UE and the base station can be performed as desired. For example, the following two methods can be employed: in the first method, the UE transmits data in advance according to the transmission time, and the base station receives data at the determined transmission time; and in the other method, the UE transmits data at the determined transmission time, and the base station determines the reception time by considering a transmission delay and then receives data at the corresponding reception time.

In addition, the method for carrying the UL delay parameter in this embodiment is the same as that in Embodiment 1. Actually, the UL delay parameter can also be carried by the methods described in Embodiments 2 to 5. In this embodiment, the transmission time is adjusted only by the UL delay. As a result, in comparison to the method for adjusting the transmitting time by introducing k1, it is likely to consume more system transmission resources.

The user common uplink time delay (e.g., the value of k1), the user-group common uplink time delay (e.g., UL delay1) and the user-specific uplink time delay indication (e.g., UL delay 2) described in the forgoing embodiments are all adjusted based on a same time unit. Specifically, the user common uplink time delay, the user-group common uplink time delay and the user-specific uplink time delay indication can be based on different time units. For example, the user common uplink time delay and the user-group common uplink time delay can be indicated and adjusted based on a subframe, and the user-specific uplink time delay can be indicated and adjusted based on a symbol or a symbol group.

The forgoing description shows specific implementations of the method for transmitting and receiving uplink data provided in the present application. The transmitting method is the processing on the UE side, and the receiving method is the processing on the base station side.

The present application further provides an equipment for transmitting uplink data and an equipment for receiving uplink data, which are used for implementing the transmitting method and the receiving method described above.

Specifically, corresponding to Embodiment 1 and Embodiment 4, the present application provides an equipment for transmitting uplink data, comprising an uplink delay extracting unit and a transmitting unit. The uplink delay extracting unit is configured to receive an RAR transmitted by a base station and extract a UL delay parameter from an uplink grant in the RAR; and, the transmitting unit is configured to determine the time to transmit an Msg3 in the random access process of the UE, according to a time unit index n and the UL delay parameter, and transmit the Msg3 according to the determined transmission time, wherein the n is a time unit index of the RAR or a time unit index indicating a downlink control channel of the RAR.

More specifically, corresponding to Embodiment 1, the uplink delay extracting unit extracts the UL delay from a UL delay field of the uplink grant; while corresponding to Embodiment 4, the uplink delay extracting unit uses a specified bit field in a fixed-size resource allocation indication of the uplink grant as a UL delay parameter and extracts the UL delay parameter.

Corresponding to Embodiment 1 and Embodiment 4, the present application provides an equipment for receiving uplink data, comprising a transmitting unit and a receiving unit. The transmitting unit is configured to transmit an RAR to a User Equipment (UE), and add a UL delay parameter to an uplink grant carried in the RAR; and, the receiving unit is configured to determine, according to a time unit index n and the UL delay parameter, the time to transmit an Msg3 in the random access process of the UE, and receive the Msg3 according to the determined transmission time, wherein the n is a time unit index of the RAR or a time unit index indicating a downlink control channel of the RAR.

More specifically, corresponding to Embodiment 1, the transmitting unit adds a UL delay field to the uplink grant to bear the UL delay parameter; while corresponding to Embodiment 4, the transmitting unit uses a specified bit field in a fixed-size resource allocation indication of the uplink grant to bear the UL delay parameter.

Corresponding to Embodiment 2, Embodiment 3 and Embodiment 5, the present invention provides an equipment for transmitting uplink data, comprising a receiving unit, an uplink delay extracting unit and a transmitting unit. The receiving unit is configured to receive downlink control channel information transmitted by a base station and receive an uplink data transmission grant according to an indication of the downlink control channel information; the uplink delay extracting unit is configured to extract a first UL delay parameter from an MAC header of the uplink data transmission grant message or from the downlink control channel information; and, the transmitting unit is configured to determine, according to a time unit index n and the first UL delay parameter, the time to transmit uplink data by the UE, and transmit the uplink data according to the determined transmission time, wherein the n is a time unit index of the uplink data transmission grant or a time unit index of the downlink control channel.

More specifically, corresponding to Embodiment 2 and Embodiment 3, the uplink data transmission grant is an RAR grant, and the uplink data is an Msg3 in the random access process of the UE. Corresponding to Embodiment 2, the uplink delay extracting unit extracts the first UL delay parameter from the downlink control channel information. Corresponding to Embodiment 3, the uplink delay extracting unit extracts the first UL delay parameter from the MAC header of the RAR grant. Corresponding to Embodiment 5, the uplink data transmission grant can be a transmission grant for any uplink data, and the uplink delay extracting unit extracts the first UL delay parameter from the downlink control channel information.

Corresponding to Embodiment 2, Embodiment 3 and Embodiment 5, the present application provides an equipment for receiving uplink data, comprising a transmitting unit and a receiving unit. Wherein, the transmitting unit is configured to transmit downlink control channel information to a User Equipment (UE), and transmit an uplink data transmission grant to the UE at a resource position indicated by the downlink control channel information, wherein a first UL delay parameter is carried in an MAC header of the uplink data transmission grant message or in the downlink control channel information; and, the receiving unit is configured to determine, according to a time unit index n and the first UL delay parameter, the time to transmit uplink data by the UE, and receive the uplink data according to the determined transmission time, wherein the n is a time unit index of the RAR or a time unit index indicating a downlink control channel of the RAR.

More specifically, corresponding to Embodiment 2 and Embodiment 3, the uplink data transmission grant is an RAR grant, and the uplink data is an Msg3 in the random access process of the UE. Corresponding to Embodiment 2, the transmitting unit adds the first UL delay parameter to the downlink control channel information. Corresponding to Embodiment 3, the transmitting unit adds the first UL delay parameter to the MAC header of the RAR grant message. Corresponding to Embodiment 5, the uplink data transmission grant can be a transmission grant for any uplink data, and the transmitting unit adds the first UL delay parameter to the downlink control channel information.

In the novel method and equipment for transmitting and receiving data provided by the present invention, different methods for carrying the UL delay are provided, and higher flexibility is realized, so that it is beneficial to improve the system performance. Further, preferably, it is also possible that a base station can instruct UEs using a same uplink receiving beams to transmit data at the same time as far as possible, so that the number of beam handovers of the base station is decreased and the delay and the hardware loss are reduced. Based on the number of available uplink resources and the number of available uplink receiving beams, the base station can determine how many different pieces of time to which UEs are to be assigned to perform transmission. For UEs using a same uplink receiving beams, the criterion for distinguishing them is as follows: distinguishing them in frequency domain and then in time domain. The uplink delay is carried by extending the number of bits for the uplink delay, or by changing the format of the Downlink Control Information (DCI), or by changing the structure of an MAC header of an RAR or in other methods. Resource assignment information (especially temporal information) required by UEs to transmit an Msg3 is informed to the UEs.

FIG. 15 is a flowchart for operation of the UE according to various embodiments of the present disclosure.

Referring to FIG. 15, in step 1501, the UE receives, from a base station, a random access response (RAR). The UE determines an RA-RNTI according to a resource assigned for the transmission of a random access request; and, the UE searches for corresponding downlink control channel information by the RA-RNTI and then searches for, according to the downlink control channel information, an RAR transmitted to the UE itself at a corresponding downlink shared channel position.

In step 1503, the UE extracts an uplink delay (UL delay) parameter from an uplink grant in the RAR. The downlink control channel information comprises the downlink shared channel position of the RAR.

In some embodiments, the UE extracts the UL delay from a UL delay field of the uplink grant. Specifically, the UE may uses a specified bit field in a fixed-size resource allocation indication of the uplink grant as a UL delay parameter and extracts the UL delay parameter.

In step 1505, the UE determines according to a time unit index n and the UL delay parameter, the time to transmit an Msg3 in the random access process of the UE. If a RAPID matched by a random access preamble transmitted by the UE itself is detected in the corresponding downlink shared channel, it is determined that the RAR carried in this downlink shared channel is an RAR transmitted to this UE. Upon receiving the RAR, the UE determines, according to an uplink grant in the RAR, a resource position for transmitting an Msg3

In step 1507, the UE transmits the Msg3 according to the determined transmission time. The UE transmits the Msg3 at the corresponding resource position.

In some embodiments, the time to transmit the Msg3 is finely tuned by the UL delay. Specifically, the UL delay value can be informed to the UE by an RAR grant (i.e., a UL grant), so that the UE obtains information about adjustment (postponement) of the time to transmit an Msg3 and then transmits the Msg3 at different time (i.e., a different UL delay value). Preferably, based on the principle that UEs using a same uplink receiving beam are distinguished in the frequency domain (at the same time) as far as possible and the condition of available uplink resources (if frequency-domain resources at a certain moment of time are limited but multiple UEs use a same uplink receiving beam, the UEs are distinguished in the frequency domain and then in the time domain), a specific value of the UL delay parameter is configured.

The forgoing description merely shows preferred embodiments of the present invention and is not intended to limit the present invention. Any modification, equivalent replacement or improvement made within the spirit and principle of the present invention shall fall into the protection scope of the present invention.

The invention claimed is:

1. A method for operating a user equipment (UE) in a wireless communication system, the method comprising:
   receiving, from a base station, downlink control channel information;
   receiving, according to an indication of the downlink control channel information, an uplink data transmission grant message transmitted to the UE;
   extracting a first uplink delay (UL delay) parameter from a Media Access control (MAC) header of the uplink data transmission grant message, wherein the first UL delay parameter is a UL delay parameter closest to a random access preamble ID (RAPID) matched with a preamble transmitted by the UE in the MAC header;
   determining, according to a time unit index n and the first UL delay parameter, a time to transmit uplink data by the UE; and
   transmitting the uplink data according to the determined transmission time,
   wherein the n is a time unit index of the uplink data transmission grant message or a time unit index of the downlink control channel information.

2. The method of claim 1, wherein, the uplink data transmission grant message is a random access response (RAR) grant message, and the uplink data is an Msg3 in a random access process of the UE.

3. The method of claim 2,
   wherein, when the UE extracts the first UL delay parameter from the downlink control channel information, the step of receiving the downlink control channel information and extracting the first UL delay parameter from the downlink control channel information comprises:
   after the UE detects a downlink control channel by using its own Random Access Radio Network Temporary Identity (RA-RNTI), deciding whether an RAR corresponding to the downlink control channel comprises the RAPID matched with the preamble transmitted by the UE itself;
   if so, extracting the first UL delay parameter from this downlink control channel; and
   if not, continuously detecting other downlink control channels until a downlink control channel comprising the RAPID matched with the preamble transmitted by the UE itself is found and extracting the first UL delay parameter from the corresponding downlink control channel; or
   stopping searching and preparing for transmission of a new random access signal according to a higher-layer indication; or
   continuously searching until a random access detection window ends.

4. The method of claim 2,
   wherein, when the UE extracts the first UL delay parameter from the MAC header of the RAR grant message, the step of extracting the first UL delay parameter comprises:

successively reading all MAC subheaders in the MAC header of the RAR message;
upon reading the RAPID matched with a preamble transmitted by the UE, using the first UL delay parameter closest to the matched RAPID, among previously read first UL delay parameters, as a first UL delay parameter to be transmitted to the UE;
wherein the RAR message comprises one or more first UL delay parameters, and different first UL delay parameters correspond to different UEs or different UE groups; and,
wherein part of MAC subheaders in the MAC header comprise UL delay parameters, and
wherein part of MAC subheaders in the MAC header comprise different RAPIDs.

5. The method of claim 2,
wherein, the method further comprises the step of:
extracting a second UL delay parameter from an uplink grant in the RAR; and,
wherein the step of determining the time to transmit the Msg3 comprises:
determining the time to transmit the Msg3 according to the n, the first UL delay parameter and the second UL delay parameter.

6. The method of claim 1,
wherein, when the UE extracts the first UL delay parameter from the downlink control channel information, the step of extracting the first UL delay parameter from the downlink control channel information comprises:
extracting a parameter value from a first UL delay field of the downlink control channel information; or
extracting, from the downlink control channel information, a UL index value as the first UL delay parameter; or, using a specified bit field for resource allocation in the downlink control channel information as a value of the first UL delay parameter.

7. The method of claim 1,
wherein, at least one of a value of the first UL delay parameter or a value of a second UL delay parameter is a value of a time unit to postpone; or, a parameter correspondence table is preset, and at least one of a value of the first UL delay parameter or a value of the second UL delay parameter is a parameter value corresponding to a value of a time unit to postpone in the parameter correspondence table.

8. The method of claim 1,
wherein, the step of determining the time to transmit the Msg3 comprises:
determining according to the n, the first UL delay parameter and a UE's common delay k1; or
determining according to the n, the first UL delay parameter, a second UL delay parameter and a UE's common delay k1,
wherein a value of the k1 is preset or determined according to system configuration information.

9. A user equipment (UE) in a wireless communication system, the UE comprising:
a transceiver; and
at least one processor operably coupled to the transceiver, and configured to:
receive, from a base station, downlink control channel information and receive an uplink data transmission grant message according to an indication of the downlink control channel information;
extract a first UL delay parameter from an MAC header of the uplink data transmission grant message, wherein the first UL delay parameter is a UL delay parameter closest to a random access preamble ID (RAPID) matched with a preamble transmitted by the UE in the MAC header; and
determine, according to a time unit index n and the first UL delay parameter, a time to transmit uplink data by the UE; and
transmit the uplink data according to the determined transmission time,
wherein the n is a time unit index of the uplink data transmission grant message or a time unit index of the downlink control channel information.

10. The UE of claim 9, wherein, the uplink data transmission grant message is a random access response (RAR) grant message, and the uplink data is an Msg3 in a random access process of the UE.

11. The UE of claim 10,
wherein, when the UE extracts the first UL delay parameter from the downlink control channel information, the at least one processor is further configured to:
after the UE detects a downlink control channel by using its own Random Access Radio Network Temporary Identity (RA-RNTI), decide whether an RAR corresponding to the downlink control channel comprises the RAPID matched with the preamble transmitted by the UE itself;
if so, extract the first UL delay parameter from this downlink control channel; and
if not, continuously detect other downlink control channels until a downlink control channel comprising the RAPID matched with the preamble transmitted by the UE itself is found and extracting the first UL delay parameter from the corresponding downlink control channel; or
stop searching and preparing for transmission of a new random access signal according to a higher-layer indication; or
continuously search until a random access detection window ends.

12. The UE of claim 10,
wherein, when the UE extracts the first UL delay parameter from the MAC header of the RAR grant message, the at least one processor is further configured to:
successively read all MAC subheaders in the MAC header of the RAR message;
upon reading the RAPID matched with the preamble transmitted by the UE, use the first UL delay parameter closest to the matched RAPID, among previously read first UL delay parameters, as a first UL delay parameter to be transmitted to the UE;
wherein the RAR message comprises one or more first UL delay parameters, and different first UL delay parameters correspond to different UEs or different UE groups; and,
wherein part of MAC subheaders in the MAC header comprise UL delay parameters, and
wherein part of MAC subheaders in the MAC header comprise different RAPIDs.

13. The UE of claim 10,
wherein the at least one processor is further configured to:
extract a second UL delay parameter from an uplink grant in the RAR; and
determine the time to transmit the Msg3 according to the n, the first UL delay parameter and the second UL delay parameter.

14. The UE of claim 9,
wherein, when the UE extracts the first UL delay parameter from the downlink control channel information, wherein the at least one processor is further configured to:
extract a parameter value from a first UL delay field of the downlink control channel information; or
extract, from the downlink control channel information, a UL index value as the first UL delay parameter; or, use a specified bit field for resource allocation in the downlink control channel information as a value of the first UL delay parameter.

15. The UE of claim 9,
wherein, at least one of a value of the first UL delay parameter or a value of a second UL delay parameter is a value of a time unit to postpone; or, a parameter correspondence table is preset, and at least one of the value of the first UL delay parameter or a value of the second UL delay parameter is a parameter value corresponding to a value of a time unit to postpone in the parameter correspondence table.

16. The UE of claim 9,
wherein the at least one processor is further configured to:
determine according to the n, the first UL delay parameter and a UE's common delay k1; or
determine according to the n, the first UL delay parameter, a second UL delay parameter and a UE's common delay k1,
wherein a value of the k1 is preset or determined according to system configuration information.

* * * * *